United States Patent
Kron et al.

(10) Patent No.: US 8,469,713 B2
(45) Date of Patent: Jun. 25, 2013

(54) COMPUTERIZED MEDICAL TRAINING SYSTEM

(75) Inventors: Frederick W. Kron, Verona, WI (US); Noah Falstein, Greenbrae, CA (US); Stacy Marsella, Playa Del Rey, CA (US)

(73) Assignee: Medical Cyberworlds, Inc., Madison, WI (US)

( * ) Notice: Subject to any disclaimer, the term of this patent is extended or adjusted under 35 U.S.C. 154(b) by 1540 days.

(21) Appl. No.: 11/776,978

(22) Filed: Jul. 12, 2007

(65) Prior Publication Data

US 2008/0020361 A1    Jan. 24, 2008

Related U.S. Application Data

(60) Provisional application No. 60/830,183, filed on Jul. 12, 2006.

(51) Int. Cl.
G09B 19/00    (2006.01)
(52) U.S. Cl.
USPC ............ 434/238; 434/236; 434/308; 434/156
(58) Field of Classification Search
USPC ................. 434/236, 238, 156, 219, 308, 350, 434/332; 345/473
See application file for complete search history.

(56) References Cited

U.S. PATENT DOCUMENTS

| | | | |
|---|---|---|---|
| 5,597,312 A | 1/1997 | Bloom et al. | |
| 5,682,469 A | 10/1997 | Linnett et al. | |
| 5,853,292 A | 12/1998 | Eggert et al. | |
| 5,867,175 A * | 2/1999 | Katzenberger et al. | 345/473 |
| 5,880,731 A | 3/1999 | Liles et al. | |
| 5,884,029 A | 3/1999 | Brush, II et al. | |
| 6,074,213 A | 6/2000 | Hon | |
| 6,077,082 A | 6/2000 | Gibson et al. | |
| 6,160,986 A * | 12/2000 | Gabai et al. | 434/308 |
| 6,193,519 B1 | 2/2001 | Eggert et al. | |
| 6,246,975 B1 | 6/2001 | Rivonelli et al. | |
| 6,285,380 B1 * | 9/2001 | Perlin et al. | 345/473 |
| 6,296,487 B1 | 10/2001 | Lotecka | |
| 6,358,053 B1 | 3/2002 | Rosenfield et al. | |
| 6,507,353 B1 * | 1/2003 | Huard et al. | 715/863 |
| 6,561,811 B2 * | 5/2003 | Rapoza et al. | 434/236 |
| 6,692,258 B1 | 2/2004 | Kurzweil et al. | |
| 6,705,869 B2 | 3/2004 | Schwartz | |

(Continued)

OTHER PUBLICATIONS

International Search Report for PCT/US07/73361 filed Jul. 12, 2007 and Written Opinion dated Sep. 16, 2008.

(Continued)

Primary Examiner — Kang Hu
(74) Attorney, Agent, or Firm — Scott A. Felder; Wiley Rein LLP

(57) ABSTRACT

A method of medical training includes presenting a user with a medical scenario within a medical simulation in which the user plays a physician. The medical scenario includes an interaction between the user and a patient. Performance data corresponding to the user is identified. The identified performance data is based at least in part on an action of the user during the interaction between the user and the patient. The user is evaluated based at least in part on the identified performance data to determine whether the user has achieved a training goal within the medical simulation. The training goal is intended to improve a medical skill of the user.

27 Claims, 8 Drawing Sheets

U.S. PATENT DOCUMENTS

| | | | |
|---|---|---|---|
| 6,807,535 B2 | 10/2004 | Goodkovsky | |
| 6,826,540 B1 | 11/2004 | Plantee et al. | |
| 6,857,878 B1 | 2/2005 | Chosack et al. | |
| 6,978,244 B2 | 12/2005 | Rovinelli et al. | |
| 7,006,098 B2* | 2/2006 | Bickmore et al. | 345/474 |
| 7,024,399 B2 | 4/2006 | Sumner, II et al. | |
| 7,061,493 B1 | 6/2006 | Cook et al. | |
| 7,090,576 B2 | 8/2006 | Herbrich et al. | |
| 7,107,253 B1 | 9/2006 | Sumner et al. | |
| 7,120,880 B1* | 10/2006 | Dryer et al. | 715/863 |
| 7,198,490 B1* | 4/2007 | Olsen | 434/365 |
| 7,277,874 B2 | 10/2007 | Sumner et al. | |
| 7,401,295 B2 | 7/2008 | Aldrich et al. | |
| 7,478,047 B2 | 1/2009 | Loyall et al. | |
| 7,484,176 B2 | 1/2009 | Blattner et al. | |
| 7,574,332 B2 | 8/2009 | Ballin et al. | |
| 7,599,838 B2 | 10/2009 | Gong et al. | |
| 7,610,556 B2 | 10/2009 | Guo et al. | |
| 7,627,536 B2 | 12/2009 | Kacmarcik | |
| 7,653,556 B2 | 1/2010 | Rovinelli et al. | |
| 7,663,628 B2 | 2/2010 | Cederwall et al. | |
| 7,725,419 B2 | 5/2010 | Lee et al. | |
| 7,811,090 B2 | 10/2010 | Eggert et al. | |
| 7,814,041 B2 | 10/2010 | Caporale et al. | |
| 2002/0005865 A1 | 1/2002 | Hayes-Roth | |
| 2002/0008716 A1 | 1/2002 | Colburn et al. | |
| 2003/0028498 A1 | 2/2003 | Hayes-Roth | |
| 2003/0091968 A1 | 5/2003 | Eggert et al. | |
| 2004/0064298 A1 | 4/2004 | Levine | |
| 2004/0179039 A1 | 9/2004 | Blattner et al. | |
| 2004/0197750 A1* | 10/2004 | Donaher et al. | 434/236 |
| 2005/0054381 A1 | 3/2005 | Lee et al. | |
| 2005/0118996 A1 | 6/2005 | Lee et al. | |
| 2005/0137015 A1 | 6/2005 | Rogers et al. | |
| 2005/0170323 A1 | 8/2005 | Jarrell et al. | |
| 2005/0223328 A1 | 10/2005 | Ashtekar et al. | |
| 2005/0255434 A1 | 11/2005 | Lok et al. | |
| 2006/0122840 A1 | 6/2006 | Anderson et al. | |
| 2006/0134585 A1 | 6/2006 | Adamo-Villani et al. | |
| 2006/0199167 A1 | 9/2006 | Yang et al. | |
| 2006/0248461 A1 | 11/2006 | Yamada et al. | |
| 2007/0003914 A1 | 1/2007 | Yang | |
| 2007/0021200 A1 | 1/2007 | Fox et al. | |
| 2007/0074114 A1 | 3/2007 | Adjali et al. | |
| 2007/0112710 A1* | 5/2007 | Drane et al. | 706/45 |
| 2007/0166690 A1 | 7/2007 | Johnson | |
| 2007/0196797 A1 | 8/2007 | Mitsuyoshi | |
| 2007/0233839 A1 | 10/2007 | Gaos | |
| 2008/0014566 A1 | 1/2008 | Chapman et al. | |
| 2008/0020363 A1 | 1/2008 | Chang | |
| 2008/0079752 A1 | 4/2008 | Gates et al. | |
| 2008/0082991 A1 | 4/2008 | Fairs et al. | |
| 2008/0104512 A1 | 5/2008 | Tarlton et al. | |
| 2008/0124690 A1 | 5/2008 | Redlich | |
| 2008/0215972 A1 | 9/2008 | Zalewski et al. | |
| 2008/0215973 A1 | 9/2008 | Zalewski et al. | |
| 2008/0254426 A1 | 10/2008 | Cohen | |
| 2008/0268418 A1 | 10/2008 | Tashner et al. | |
| 2009/0044112 A1 | 2/2009 | Basso et al. | |
| 2009/0053681 A1 | 2/2009 | Shen et al. | |
| 2009/0094517 A1 | 4/2009 | Brody et al. | |
| 2009/0098524 A1 | 4/2009 | Walton | |
| 2009/0099836 A1 | 4/2009 | Jacobsen et al. | |
| 2009/0115776 A1 | 5/2009 | Bimbra et al. | |
| 2009/0186635 A1 | 7/2009 | Vieri | |
| 2009/0216691 A1 | 8/2009 | Borzestowski et al. | |
| 2009/0276802 A1 | 11/2009 | Amento et al. | |
| 2009/0298039 A1 | 12/2009 | Glazier | |
| 2010/0028846 A1 | 2/2010 | Cohen et al. | |
| 2010/0092936 A1 | 4/2010 | Pfingsten et al. | |
| 2010/0097395 A1 | 4/2010 | Chang et al. | |
| 2010/0114595 A1 | 5/2010 | Richard | |
| 2010/0141663 A1 | 6/2010 | Becker et al. | |
| 2010/0159434 A1 | 6/2010 | Lampotang et al. | |
| 2010/0198579 A1 | 8/2010 | Cunnington et al. | |
| 2010/0211397 A1 | 8/2010 | Park et al. | |
| 2010/0217619 A1 | 8/2010 | Cox et al. | |
| 2010/0250196 A1 | 9/2010 | Lawler et al. | |
| 2010/0251117 A1 | 9/2010 | Baughman et al. | |
| 2010/0251147 A1 | 9/2010 | Donovan et al. | |
| 2010/0266998 A1 | 10/2010 | Tashiro et al. | |
| 2010/0274575 A1 | 10/2010 | Lemke et al. | |
| 2010/0286987 A1 | 11/2010 | Han et al. | |

OTHER PUBLICATIONS

"The Interactive Patient", web page from www.archive.org, Marshall University, Joan C. Edwards School of Medicine. (2004).

"Penfield Virtual Hospital", web page from www.hud.ac.uk University of Huddersfield. (2003).

Ponder, et al., "Interactive Scenario Immersion: Health Emergency Decision Training in JUST Project", Swiss Federal Institute of Technology. (2002).

* cited by examiner

COMPUTERIZED MEDICAL TRAINING SYSTEM

CROSS-REFERENCE TO RELATED APPLICATIONS

This application claims priority from U.S. Provisional Application No. 60/830,183, filed Jul. 12, 2006, and incorporated herein by reference in its entirety.

FIELD

The subject of the disclosure relates generally to medical training. More specifically, the disclosure relates to a method, system, and computer-readable medium for teaching empathy, patient-centeredness, professionalism, interviewing micro-skills, and communication skills (e.g., bedside manner) through constructivist learning in a social, three-dimensional environment with emotionally expressive avatars.

BACKGROUND

During medical school, medical students learn human anatomy, disease symptoms, disease stages, diagnostic techniques, treatment techniques, and other scientific information needed to think critically about the diagnosis and treatment of illnesses. However, being a good physician requires more than just scientific knowledge. A physician also needs to be able to form and maintain effective relationships with his/her patients. This can be challenging because each patient is a unique individual that can differ from other patients in appearance, background, experience, educational level, cognitive ability, religion, attitude, ethnicity, etc. To form effective relationships with such a wide array of patients, the physician must be patient, perceptive, understanding, supportive, and empathic. In addition, the physician needs to be able to portray his/herself as a knowledgeable and trustworthy individual.

Present-day medical curriculums focus on conveying scientific knowledge and do not adequately train physicians in patient interactions. This lack of curricular emphasis on medical humanism and the lack of proper integration of sociological and psychological information into medical training results in physicians who do not have the necessary tools to understand patients as people, to effectively convey information to patients, or to effectively listen to patients. Even in medical schools in which an effort to teach medical humanism is made, the effort is largely ineffective. Books and lectures do not even begin to expose medical students to the wide array of situations in which physicians find themselves during their day-to-day practice. Further, books and lectures do not provide medical students with any experience in interacting with patients, colleagues, medical staff, pharmacists, superiors, insurance company representatives, or other individuals involved in the medical profession. Books and lectures are further limited in their ability to help medical students understand why certain information is critical to acquire, and what the consequences are if that information is ignored.

As a result of the above-mentioned curricular deficiency, the majority of physicians are unable to effectively communicate with or otherwise relate to their patients. Poor physician/patient relationships can lead to misdiagnosis and/or other medical errors. Medical errors result in approximately 200,000 patient deaths each year, more than the number of individuals who die from motor vehicle accidents, breast cancer, and AIDS combined. Medical errors are also the primary basis for medical malpractice claims brought against physicians. In addition, poor physician/patient communication can lead to uninformed patients, misinformed patients, unhappy patients, patients who are unable or unwilling to adhere to a prescribed treatment, and/or patients who reject the medical profession.

Another problem in the medical profession is that most physicians enter practice with no concept of medical economies, medical policies, good business practices, or good management practices. This again stems from an inability to effectively teach these skills in a traditional medical school classroom. Yet another problem in the medical profession is the lack of consistency in medical practices across professional communities. Medical practices are inconsistent from region to region, from state to state, from medical school to medical school, and even among different faculty at the same medical school. Inconsistent medical practices can make it difficult for physicians to transfer locations and/or work with physicians in other geographic regions. Inconsistencies can also make a difficult and sometimes frustrating profession even more frustrating for new medical school graduates. In addition, it can be especially difficult for medical students because inconsistencies exist not only between regions and individuals, but also between the attitudes and practices that medical students observe and the values that are explicitly taught to them. This so-called 'hidden curriculum' (i.e., the social and cultural aspects of education that exist alongside an educational institution's stated or intended curricular objectives) creates a huge problem for medical students as they try to develop an ethical and reflective style of practice.

Thus, there is a need for a medical training system capable of teaching medical personnel how to effectively interact with patients through actual experience. There is also a need for a medical training system capable of teaching medical personnel how to effectively interact with other physicians, assistants, staff, billing coordinators, and any other personnel associated with the medical profession. There is also a need for a medical training system capable of effectively teaching medical personnel about medical economics, medical policy, good business practices, and good management practices. Further, there is a need for a medical training system capable of consistently training a large number of medical personnel such that medical practices are able to become more consistent throughout the medical profession and conform more closely to the humanistic, patient-centered values that are espoused.

SUMMARY

An exemplary method of medical training includes presenting a user with a medical scenario within a medical simulation in which the user plays a physician. The medical scenario includes an interaction between the user and a patient. Performance data corresponding to the user is identified. The identified performance data is based at least in part on an action of the user during the interaction between the user and the patient. The user is evaluated based at least in part on the identified performance data to determine whether the user has achieved a training goal within the medical simulation. The training goal is intended to improve a medical skill of the user.

An exemplary computer-readable medium has computer-readable instructions stored thereon that, upon execution by a processor, cause the processor to maintain a medical simulation. The instructions are configured to present a user with a medical scenario in which the user plays a physician. The medical scenario comprises an interaction between the user and a patient. Performance data corresponding to the user is identified. The identified performance data is based at least in part on an action of the user during the interaction between the user and the patient. The instructions are further configured to determine, based at least in part on the identified performance data, whether the user has achieved a training goal within the medical simulation. The training goal is intended to improve a medical skill of the user.

An exemplary system for medical training includes a medical training engine, a memory, and a processor. The medical training engine includes computer code configured to generate a medical scenario within a medical simulation. The medical scenario is presented to a user, where the user plays a physician within the medical scenario. Performance data based on an action of the user within the medical scenario is identified. The computer code is further configured to determine, based at least in part on the identified performance data, whether the user has achieved a training goal within the medical simulation. The training goal is intended to improve a medical skill of the user. A status of the user is increased within the medical simulation if the user has achieved the training goal. The memory is configured to store the medical training engine. The processor is coupled to the memory and configured to execute the medical training engine.

Other principal features and advantages will become apparent to those skilled in the art upon review of the following drawings, the detailed description, and the appended claims.

BRIEF DESCRIPTION OF THE DRAWINGS

Exemplary embodiments will hereafter be described with reference to the accompanying drawings.

DETAILED DESCRIPTION

Figure 1:
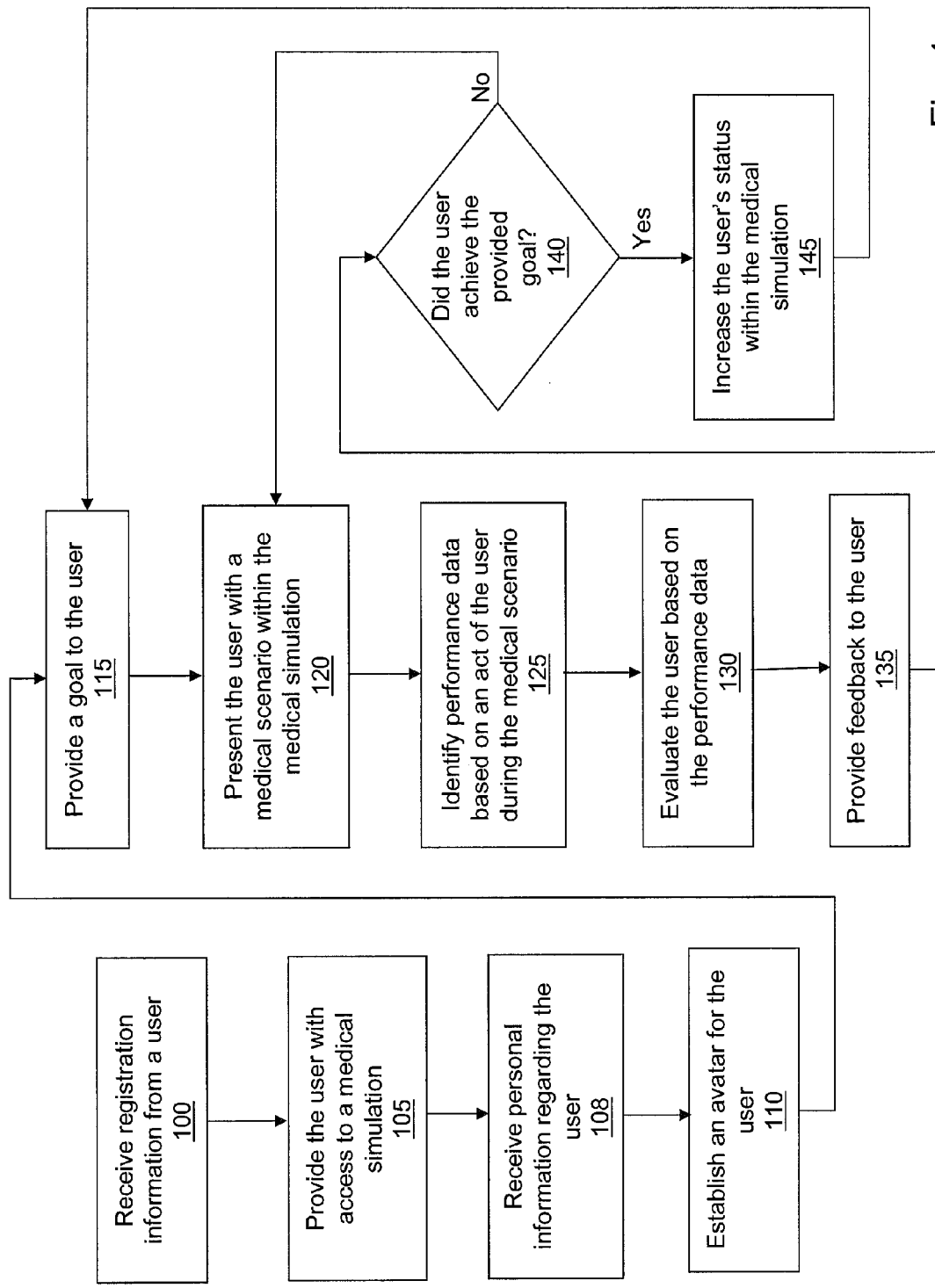
FIG. 1 is a flow diagram illustrating operations performed by a medical training system in accordance with an exemplary embodiment.

Described herein is a training system adapted to teach users how to successfully interact with other individuals. In an exemplary embodiment, the training system (or system) can be an on-line simulation in which users can interact with one another and participate in scenarios. The system can also refer to any of the hardware and/or software which is used to implement the simulation. The system can be implemented by any programming method known to those of skill in the art. In an exemplary embodiment, the on-line simulation can utilize massively multi-player on-line gaming (MMOG) structures, procedures, and methodologies. As such, the simulation can take place in a distributed, three-dimensional synthetic environment. The synthetic environment, which may include game play design elements, can also include avatars. As used herein, an avatar can refer to a simulated character controlled by a live user or a computer controlled (i.e., virtual) character within the simulation. Avatars controlled by the computer can feature cognitive and emotional modeling such that their behavior is highly realistic and human-like. The synthetic environment, which may include game play design elements, can also include realistic avatars that feature cognitive and emotional modeling. As used herein, an avatar can refer to a simulated character controlled by a live user or a computer controlled (i.e., virtual) character within the simulation. These features can combine to create a naturalistic, highly social, and constructivist learning environment in which users can experientially learn values, empathy, patient and/or client-centeredness, professionalism, interviewing micro-skills, communication skills, etc. The simulation can also utilize virtual reality technology to further enhance the realism and impression of the simulation.

As described herein, the system can be used to teach medical students how to interact and form relationships with patients and/or any other individuals whom they may encounter in their role as physicians. The system can also be used by practicing physicians to obtain continuing medical education credits, by medical school professors to interact with and test their students, by medical staff for training purposes, by patients who want to form better relationships with their physicians, and/or by the general public as a diversion. While the training system is primarily described with reference to training in the medical field, it is important to understand that the system is not so limited. Using the same principles described herein, the training system can be applied to any field/profession in which individuals are required to interact and form relationships with other individuals. For example, the training system can be used in the legal field to teach law students and attorneys how to effectively interact with their clients. Similarly, the training system can be used to teach nurses, dentists, business managers, coaches, teachers, receptionists, customer service specialists, bankers, etc. how to interact with and treat their clients, students, and/or employees.

FIG. 1 is a flow diagram illustrating operations performed by a medical training system in accordance with an exemplary embodiment. Additional, fewer, or different operations may be performed in alternative embodiments. In an operation 100, the medical training system can receive registration information from a user. The registration information can include the user's name, contact information, profession, level of training, etc. The registration information can be received by any method known to those of skill in the art. In one embodiment, the system can also receive a monetary fee from the user during registration. The monetary fee can be paid directly by the user, by the medical school which the user attends, by the user's employer, or by any other entity. In an exemplary embodiment, the user can be a medical student, and the registration process can be performed when the medical student registers for a class which utilizes the medical training system as an instructional tool.

In an operation 105, the system provides the user with access to a medical simulation. The medical simulation can be a virtual world including one or more medical settings in which physicians can interact with patients and other individuals. The medical settings can be any locations, such as a clinic, a hospital, a patient's home, a nursing home, a hospice facility, etc., in which a medical practitioner may be called upon to practice medicine. The medical simulation can also include homes, stores, vehicles, banks, governments, etc. in both urban and rustic settings to make the medical simulation more realistic. Access to the medical simulation can be provided through medical simulation software which the user downloads and installs on his/her computer. Alternatively, access can be provided through a website upon which the medical simulation can be accessed. Alternatively, access to the medical simulation can be provided by any other method known to those of skill in the art. In one embodiment, different versions of the medical simulation can be used to accommodate different types of users. A first version can be for medical student users, a second version can be for practicing physician users, and a third version can be for the general public. Alternatively, a single version can be used to accommodate all system users.

Figure 2:
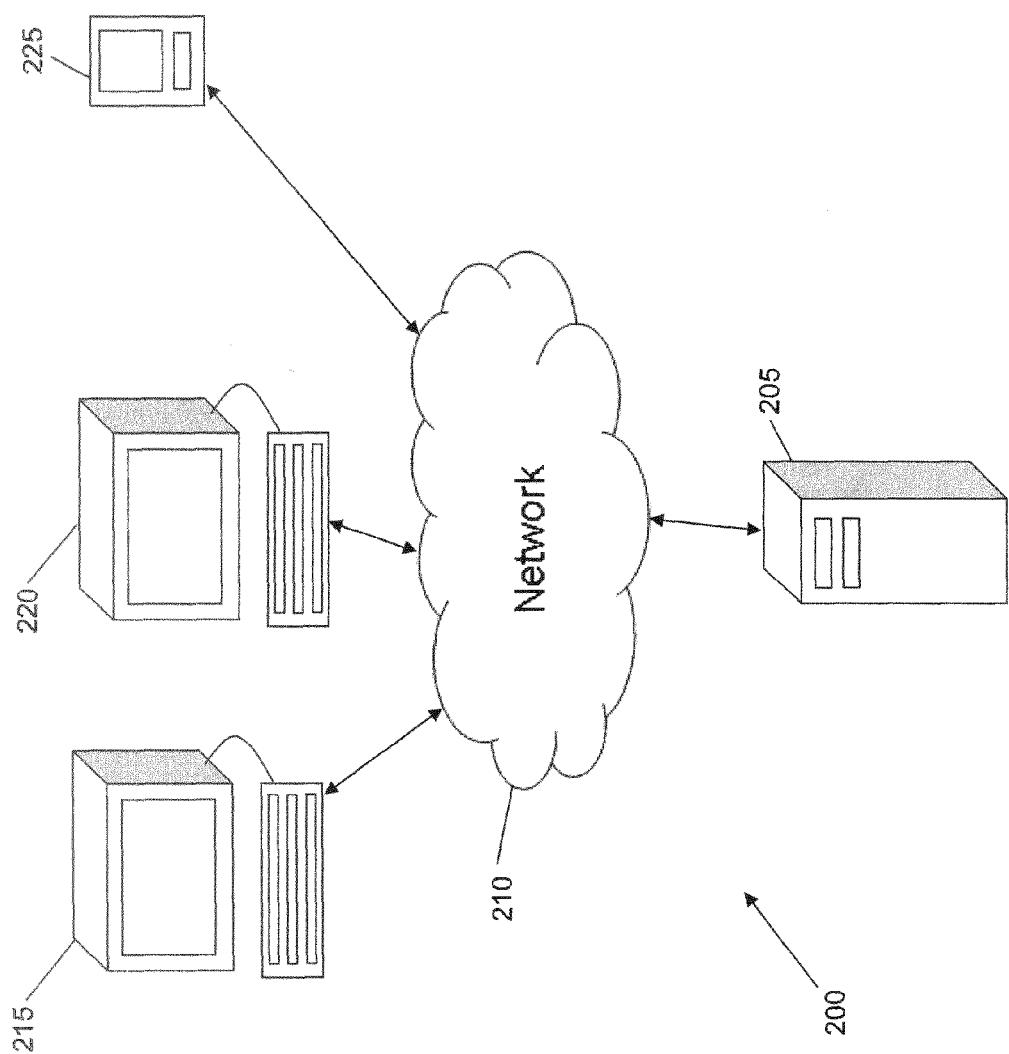
FIG. 2 is a medical training system in accordance with an exemplary embodiment.

In an exemplary embodiment, the medical simulation can be an on-line world which is accessible through a network such as the Internet. As such, multiple users can interact with and learn from one another. FIG. 2 is a medical training system 200 in accordance with an exemplary embodiment. Medical training system 200 includes a medical training server 205 connected to a network 210. Medical training server 205 can be a computer including a memory, a processor, and input/output ports. As such, medical training server 205 can be capable of maintaining one or more medical simulations, receiving data from users within the one or more medical simulations, sending data to users within the one or more medical simulations, and/or storing data corresponding to the users and/or the one or more medical simulations. Network 210 can be any network upon which information can be transmitted as known to those of skill in the art. A first user device 215, a second user device 220, and a third user device 225 can be in communication with medical training server 205 through network 210. First user device 215 can be a desktop computer of a first user, and second user device 220 can be a laptop computer of a second user. Third user device 225 can be a cellular telephone, personal digital assistant, or any other electronic device of a third user which is capable of communicating with medical training server 205 through network 210. In an alternative embodiment, the system may communicate with users through peer-to-peer networking, and medical training server 205 may not be used.

Referring back to FIG. 1, in an operation 108, the system receives personal information regarding the user. The personal information can be any information which can be used to evaluate the user's medical experience, medical skills, strengths, weaknesses, and/or computing experience. The personal information can be used to help design an avatar for the user, to determine appropriate training goals for the user within the medical simulation, and/or to determine appropriate medical scenarios in which the user should participate. As an example, the user can indicate that his/her biggest fear is conveying bad news, such as telling the patient that he/she has a chronic illness, that his/her therapy has failed, that he/she is going to die, etc. To help the user overcome this fear, the user can be placed in medical scenarios with patients who need to be told that they suffer from a chronic illness. The personal information can also include psychometric data of the user. The psychometric data may be used to condition interactions of the user within the medical simulation.

In an exemplary embodiment, the personal information can be received directly from the user. Alternatively, the personal information can be received from the user's professor, colleagues, patients, etc. In an alternative embodiment, the personal information can be obtained during the registration process described with reference to operation 100. In another alternative embodiment, the personal information can be received as part of a medical simulation tutorial presented to the user. Alternatively, the medical simulation tutorial may be presented to the user only if the user indicates that he/she has a lack of computing experience or lack of experience within virtual worlds.

In an operation 110, an avatar is established for the user. The avatar can be a digital representation of the user through which he/she is able to interact in the medical simulation with the avatars of other users and avatars generated and controlled by the system. In one embodiment, the user can select his/her avatar such that the avatar is similar in appearance to the user. For example, if the user is a 25 year old, 5' 4" white female with blond hair, she can select an avatar with those characteristics. Alternatively, the user may be allowed to select an avatar with any other of a normal range of human characteristics. In an alternative embodiment, the avatar may be assigned to the user by the system or a training administrator such as a medical school professor. For example, a female user may be assigned a male avatar such that the female user can experience how various patients respond to a male physician and/or how various physicians respond to a male patient. In another alternative embodiment, the system can assign an avatar to the user based on the received personal information regarding the user.

In an exemplary embodiment, the user can have at least one avatar for each role that he/she is to play within the medical simulation. For example, the user can select (or be assigned) a physician avatar for his/her role as a physician, and a patient avatar for his/her role as a patient. In another exemplary embodiment, the patient avatar can be generated by the system to exhibit specific patient traits. In addition, the patient avatar may not be specific to the user such that a plurality of users can use the same patient avatar either simultaneously or at different times within the medical simulation. In an alternative embodiment, the user can have a single avatar for all of his/her roles within the medical simulation.

In an exemplary embodiment, the established avatar can have a status and/or characteristics which may change over a period of time. For example, a new user, such as a first year medical student who is to play the role of a physician, can have a beginner status. As such, the first year medical student's avatar can exhibit characteristics typical of a novice physician. For example, the avatar can appear hesitant, unsure, or intimidated when interacting with a patient. These characteristics can be exhibited through facial expressions of the avatar, body language of the avatar, the dialog of the avatar, and/or the general appearance of the avatar. Once the first year medical student has passed an exam, achieved a goal, or otherwise proved his/herself within the medical simulation, the status and/or characteristics of his/her avatar can be upgraded to reflect a more experienced physician. For example, as a second year medical student, the user can have an intermediate status such that his/her avatar appears and/or acts more calm and professional within the medical simulation. Other aspects of an avatar which may change over time can include the avatar's clothing, the avatar's title (i.e., intern, resident, new doctor, senior doctor, etc.), the avatar's prestige, the avatar's trustworthiness, the avatar's friendliness, etc.

In an alternative embodiment, the status and/or characteristics of the avatar can be based on actual characteristics of the user. For example, the user can be an impatient person who tends to get upset when a patient does not understand an instruction or explanation. The avatar of the impatient user can likewise exhibit the user's impatient behavior through body language and facial expressions. While interacting with patients within the medical simulation, the user can view his/her avatar and see first hand how the impatient behavior adversely affects the patient relationship. In an exemplary embodiment, characteristics to be attributed to a user's avatar can be identified by the user, a medical school professor who teaches the user, the user's colleagues in the medical practice, feedback from actual patients of the user, etc.

In an operation 115, a goal is provided to the user. In an exemplary embodiment, the goal can be a basis within the medical simulation by which the user is able to elevate the status and/or characteristics of his/her avatar. For example, the goal may be to have a 90% or higher patient satisfaction rate within the medical simulation over a specified period of time. Alternatively, the goal may be to overcome an adverse characteristic of the user such as hesitancy, impatience, arrogance, condescendence, etc. These characteristics can be operationally defined within the medical simulation such that they are amenable to modification. The goal can also be to improve a patient's attitude, to convince a patient to adopt a healthier lifestyle, to convince a patient to follow a treatment schedule, or otherwise improve a patient's health. The goal can also be to successfully manage a medical facility with a given budget, to learn how to admit patients as a receptionist, to learn how to deal with grieving family members of a patient, to accurately diagnose patients, to handle a false accusation by a patient, to apologize for a mistake, etc.

In one embodiment, users can be provided with one or more short term goals, one or more medium term goals, and/or one or more long term goals. For example, in the role of a physician, the user may have a short term goal of convincing a hypertensive patient to comply with his/her medication regimen. The user may also have a medium term goal of obtaining a patient satisfaction rating of at least 85% for a physician/patient interaction which occurs over a plurality of office visits and over an extended period of time. Patient satisfaction can be determined based on dialog used by the physician, feedback from the patient, and/or an evaluation from a professor or other observer of the interaction. The patient can be a live user or a computer-generated virtual patient. Feedback can be obtained directly from the patient user, generated by the system, and/or provided by one or more third parties who view the interaction. The user may have a long term goal of passing a set of standardized exams at the end of a course which features the medical training system as a learning tool.

In the role of a patient, the user may be a respected businessman who is addicted to drugs. The patient can have a short term goal of convincing a physician to issue a drug prescription without divulging his illegal drug use. The patient can have a medium term goal of getting referred to an out of town specialist (contrary to his insurance rules) for a seemingly simple infection. The patient can have a long term goal of seeking treatment for what he suspects may be AIDS without divulging his drug use or the fact that he has shared needles with others. A patient goal can also include convincing the physician that the patient is healthy such that the patient is relieved from thinking about his/her illness. As such, the 'victory' conditions for the physician and for the patient may conflict with one another. These types of patient goals can be used as a tool to inform physicians about the potentially obscure, counter-intuitive, and seemingly counterproductive motivations of patients. The patient goals can also reveal the necessity of taking a broad, psychobiosocial view of the patient such that the user can completely understand and adequately address the patient's true concerns.

In an exemplary embodiment, upon completion of a goal, the user's status within the medical simulation can improve. The user's status can be improved by enhancing his/her avatar, by increasing his/her salary within the medical simulation, by giving him/her a promotion, or otherwise advancing/enhancing the professional status of the user. Alternatively, the user's training within the medical simulation can be completed when a goal is achieved. In another exemplary embodiment, the goal(s) for the user can be established by the system, by a medical professor, by colleagues of the user, by the user, by patients, and/or by a medical examination board. In one embodiment, the goal(s) can be established based at least in part on the received personal information regarding the user.

In an operation 120, the user is presented with a medical scenario within the medical simulation. In an exemplary embodiment, the medical scenario can be a physician/patient interaction in which the user plays the role of either the physician or the patient. Alternatively, the medical scenario can be an interaction between a physician and relatives of a patient who has undergone surgery, been diagnosed with a terminal illness, passed away, or been successfully treated. The medical scenario can also be an interaction between an emergency medical technician and an accident victim at the scene of an accident, an interaction between an emergency room desk attendant and an individual seeking admittance into the emergency room, an interaction between a medical facility administrator and a bill collector, an interaction between medical personnel and an insurance company, or any other interaction which can occur in the medical profession. Medical scenarios are described in more detail with reference to FIG. 3.

In an operation 125, the system identifies performance data based on an act of the user during the medical scenario. The performance data can be any information related to the user's behavior during the medical scenario which can be used to grade, score, view, or otherwise evaluate the user. For example, the performance data can be an audio and/or video capture of the medical scenario which is capable of being replayed from any point of view by an evaluator. The performance data can also be timing information based on occurrences within the medical scenario, accuracy data based on statements made by the user during the medical scenario, accuracy data based on a diagnosis made by the user, accuracy data based on a test run on a patient by the user, feedback from any participants in or viewers of the medical scenario, professor comments, decisions made by the user, metrics regarding the user's style of interaction, etc. The performance data can also include eye movements of the user. For example, a camera can be used to track the user's eye movements during a medical scenario to determine whether the user is making eye contact with a patient, looking down at the ground, rolling his/her eyes, etc. Similarly, in embodiments in which speech is used, the performance data can include voice analysis data. For example, a microphone and a speech analyzer can be used to detect a stress level of the user, a nervousness level of the user, a tone of voice (i.e., friendly, hostile, etc.) of the user, and so on. In one embodiment, a camera may be used to capture the user's eye movements, facial expressions, body language, and other body movements. The captured movements/expressions can be attributed to the user's avatar in real time such that the avatar mimics what the user is doing in the real-world. Any or all of the captured movements/expressions can also be used as performance data to evaluate the user.

As an example, a medical scenario can be an interaction between a patient and a physician in an examination room of a medical clinic. The physician can be a first user, and the patient can be a second user or a computer controlled patient, depending on the embodiment. The physician can elicit symptom information from the patient, perform tests on the patient, access medical literature, make a diagnosis based on the symptom information, provide the diagnosis to the patient, and/or recommend one or more treatment options to the patient. The performance data can be based on the physician's sincerity when speaking with the patient, questions asked by the physician, the physician's level of seriousness, the physician's responses to questions asked by the patient, the physician's handling of phone calls or pages during the patient examination, the level of trust which the physician engendered in the patient, the punctuality of the physician, the physician's ability to detect falsehoods from the patient, and/or the responsiveness of the physician. Physician characteristics such as sincerity, trust, and seriousness can be operationally defined such that they can be measured and used as part of the user's evaluation. The performance data can also be based on the accuracy of the physician's diagnosis, the accuracy of tests run by the physician, the accuracy of the treatment recommended by the physician, etc. In an exemplary embodiment, performance data can also be captured based on the patient's actions during medical scenarios in which the patient is also a user. Performance data of a patient can be used to ensure that the patient is acting realistically, is responding appropriately, and is not in collusion with the physician.

In an operation 130, the user is evaluated based on the performance data. In an exemplary embodiment, the user can be evaluated (or assessed) by a professor, a superior, a medical board, a testing agency, or any other individual(s) associated with the user. Alternatively, the user can be evaluated by the system. The evaluation, which can be objective or subjective, can be based on any criteria established by the evaluator (s). In one embodiment, the user can be evaluated by comparing his/her handling of a medical scenario to the handling of the medical scenario by one or more medical experts. The user can be evaluated after each medical scenario in which the user participates, after participation in a predetermined number of medical scenarios, at an established time such as the end of a semester, and/or randomly. In one embodiment, the user can be evaluated to determine whether the user has achieved the goal provided to the user in operation 115.

In an exemplary embodiment, regular users such as medical student users may be limited in their ability to access and/or alter archived information regarding occurrences within the medical simulation. Training administrators and other special users may be provided with expanded or unlimited access such that they can effectively evaluate other users. For example, a medical student user may not be able view or alter a patient interaction in which he/she participated. A professor of the medical student may be given the ability to replay the patient interaction from any point of view, add commentary to the patient interaction, and/or alter the patient interaction such that the medical student user can be shown his/her mistakes.

In an exemplary embodiment, access to and within the medical simulation can be broken down into categories including observer access, limited student access, standard student access, assistant instructor or privileged student access, professor access, simulation administrator access, and developer access. An observer can refer to an individual who watches others participate in the medical simulation, but who does not his/herself participate. Observer access allows the observer to follow an individual avatar in the medical simulation and view interactions of the avatar from a third person point of view. The observer is not able to communicate with the avatar, control the avatar, or otherwise affect any part of the medical simulation. The observer may be a professor who wishes to introduce his/her class to interactions within the medical simulation.

Users with limited student access may have access to only a limited portion of the medical simulation or only to certain avatars within the medical simulation. Alternatively, limited student access may include full access to the medical simulation for only a limited amount of time per day or per week. As an example, a limited student may be a pre-med student who is only allowed to play the role of a patient within the medical simulation. Standard student access can provide participants with the ability to fully control one or more physician avatars and one or more patient avatars within the medical simulation. The standard student can fully participate in physician/patient interactions. Assistant instructor or privileged student access can be granted to teaching instructors or exceptional students. This level of access allows the user to slightly bend the rules of the medical simulation for the sake of learning. Professor access allows the professor to start new simulation sessions, observe students, and take over student avatars. Professor access also allows the professor to edit a student's records, alter a student's access level, and alter a student's in-game abilities. Simulation administrator access allows the simulation administrator to change any variables, records, etc. regarding the medical simulation which do not require changes to the source code. Developer access allows the developer to have full and complete access to the medical simulation, including the ability to alter the source code of the medical simulation.

In an operation 135, feedback is provided to the user. The feedback can be generated by the system, provided by an evaluator, and/or provided by a participant in a medical scenario in which the user participated. The feedback can be in the form of a score, grade, comment, or any other indicator of the user's performance within the medical simulation. In one embodiment, feedback can be provided as commentary along with an audiovisual replay of the medical scenario for which feedback is being provided. Feedback can also occur in the form of negative and positive consequences within the medical simulation. For example, if the user is able to successfully convince a patient to take his/her medicine, the patient may be cured of his/her ailment. If the user is unable to convince the user to take his/her medicine, the patient may end up in a coma, and the patient's family may sue the user for medical malpractice. As such, the medical simulation provides users with an experiential, constructivist learning model. Feedback can be provided to the user at any time during or after the medical scenario. In one embodiment, feedback can be instantly provided by the system or a monitor when the user makes a serious or fatal mistake during a medical scenario.

Feedback in the form of consequences within the simulation provides users with experiential learning. In addition to consequences resulting from physician/patient interactions, the consequences may also result from a variety of user actions and choices within the simulation. For example, a user who discovers and explores a Korean neighborhood within the simulation, may develop a better understanding of Korean culture, Korean attitudes towards life and death, family relationships, the use of herbs and other complementary medical techniques by Koreans, etc. The consequence of this discovery may in turn impact an interaction with a Korean patient that the user is treating. As another example, a user may decide to do a home visit for a seemingly noncompliant diabetic patient and discover that the patient lives in a homeless shelter. As a result, the system may guide the user such that he/she learns about health care options for the indigent or how/where to obtain free medication for the indigent such that the patient can be successfully treated. The home visit may even lead the user to attempt to effect political change within the simulation by creating or expanding a free clinic for the indigent. It can thus be appreciated that the simulation is dynamic and able to provide a user with challenges based on areas in which the system perceives that the user needs improvement.

In an operation 140, a decision is made regarding whether the user achieved the provided goal. If the user has not achieved the provided goal, the system can present the user with another medical scenario in operation 120, and the process can be repeated until the user achieves the goal. If the user has achieved the provided goal, the system can increase the user's status within the medical simulation in an operation 145. The user's status can be increased by increasing the user's skill level(s), increasing the user's salary, enhancing the user's avatar, increasing the professional prestige of the user, increasing the medical skill set of the user, lowering a malpractice rate of the user, increasing the number of patients of the user, and/or otherwise advancing the user. In an exemplary embodiment, the user can be provided with a new goal in operation 115, and the process can be repeated until the user achieves the new goal. Alternatively, upon achieving the provided goal, the user may be finished with his/her training within the medical simulation.

Figure 3:
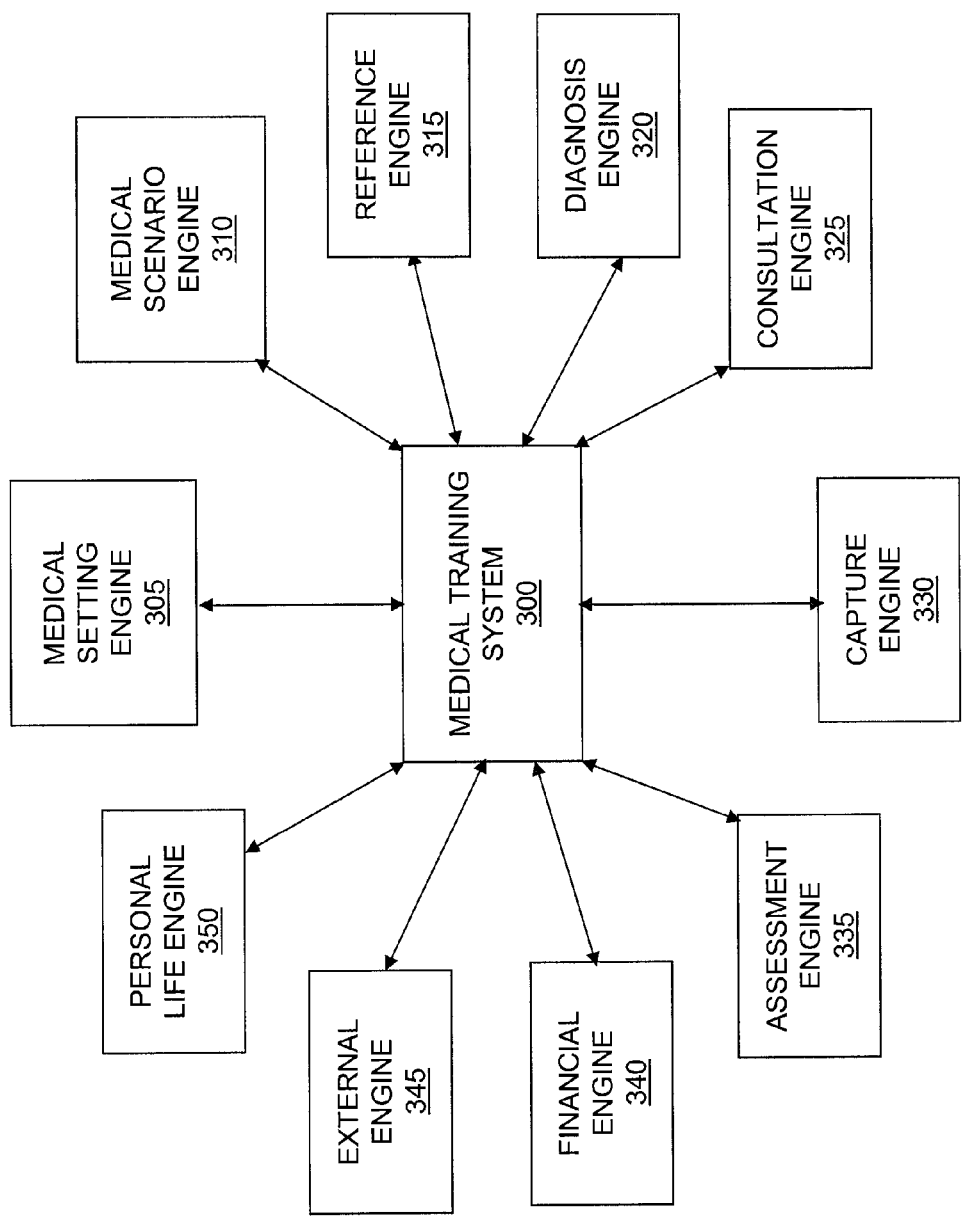
FIG. 3 is a diagram illustrating components of a medical training system in accordance with an exemplary embodiment.

FIG. 3 is a diagram illustrating components of a medical training system 300 in accordance with an exemplary embodiment. Additional, fewer, or different components can be included in alternative embodiments. Medical training system 300 can include a medical setting engine 305, a medical scenario engine 310, a reference engine 315, a diagnosis engine 320, a consultation engine 325, a capture engine 330, an assessment engine 335, a financial engine 340, an external engine 345, and a personal life engine 350.

In an exemplary embodiment, medical setting engine 305 can be used to provide and maintain a medical setting in which medical scenarios can take place. The medical setting can be a medical clinic, a hospital, an emergency room, a patient's home, an accident site, a natural disaster site, a private practice, or any other location in which a medical practitioner may be called upon to practice medicine. Alternatively, the medical setting can be any other location in which a physician, patient, or medical staff member may go during the course of practicing medicine or seeking medical treatment. In an exemplary embodiment, medical setting engine 305 can provide a plurality of medical settings such that the medical simulation is more realistic. For example, a physician may have a first appointment at a first clinic at 2:00 pm, a second appointment at a second clinic at 3:30 pm, and a third appointment at a hospital at 5:00 pm. In an exemplary embodiment, the medical settings can be part of a seamless continuum of the simulated world. Alternatively, medical settings may occur as discrete, single user or group instances within the simulated world.

In an exemplary embodiment, at least one medical setting within the medical simulation can be a clinic. The clinic can include a reception desk with a receptionist, a patient waiting area, a screening area, a nursing station, a plurality of physicians' offices, a plurality of patient examination rooms, a clinic manager's office, a patient check-out area, an on-site laboratory, etc. In one embodiment, the receptionist, janitors, and other staff members can be computer controlled simulations. Alternatively, any or all of the staff members can be played by system users. For example, the receptionist can be a user, and medical training system 300 can be used to train the user such that he/she becomes accustomed to handling patients, collecting insurance information, taking phone calls, scheduling follow up visits, and/or performing any other tasks expected of a receptionist.

In another exemplary embodiment, the clinic can also include a plurality of virtual computer terminals through which an electronic health record (EHR) system can be accessed by physicians. Physicians can use the EHR system to access a patient's personal information, insurance information, laboratory reports, x-ray data, consultant reports, and/or medical history. Physicians can also use the fully functional EHR system to order laboratory tests, to enter prescriptions, to obtain, complete, and/or dispatch standard forms (i.e., back-to-work, disability, school notes, etc.), to automatically set up 'tickler' files to remind the physician when patient studies and follow-up visits are due, to collect and/or analyze information regarding populations of patients with chronic conditions, etc. The EHR system may provide full coding features for billing purposes. The EHR system can also include a virtual conference feature such that users can form care teams and work in groups. The virtual conference feature can allow a plurality of users to simultaneously review patient information, consult an expert, hold a roundtable discussion, or otherwise communicate with one another. In one embodiment, the EHR system may include information regarding a real-world patient, and the virtual conference feature may be used by real-world physicians to communicate about treatment of the patient.

The computer terminals within the simulation can also be information portals through which physicians can practice medicine and/or learn about the medical field. Users can also use the computer terminals to acquire timely information about their patient(s), their colleagues, or any psychobiosocial topic that is relevant to the challenging problems within the simulation. The information may be provided by content experts in a synopsized, contextualized form. The information may also be provided through links to a simulated or real-world biomedical library. In one embodiment, each examination room within the clinic can include a virtual computer terminal (i.e., information portal) such that the physician can retrieve and/or enter data as the physician is examining the patient.

The clinic can also have a flag system in place such that users are provided with visual cues indicating the status of rooms within the clinic. For example, a blue flag outside of an exam room can indicate that a nurse is prepping a patient for a visit, a green flag can indicate that a patient is waiting to be seen, a yellow flag can indicate that a physician is in the exam room with the patient, a red flag can indicate that the physician is finished with the patient and the patient is ready for checkout, a white flag can indicate that lab tests are needed for the patient, a black flag can indicate that x-rays are needed for the patient, a brown flag can indicate that the exam room needs to cleaned and prepared for the next patient, and so on. In addition, the clinic can be ergonomically sound, wheelchair accessible, in compliance with any applicable real-world building and/or design codes, and decorated with calming colors and décor that reflects the current standard in intelligent real-world clinic design.

Medical scenario engine 310 can be used to implement a medical scenario within one of the medical settings. In an exemplary embodiment, the medical scenario can be an interaction between a physician and a patient, and the roles of the patient and/or the physician can be played by users. Alternatively, the roles of the patient and/or the physician can be played by computer controlled characters. Such computer controlled characters can be designed to incorporate cognitive and emotional systems such that they behave like human physicians and patients and are as believable in their roles as human physicians and patients. In an alternative embodiment, the medical scenario can be any other interaction between patients, physicians, medical staff, and/or other individuals who may be encountered during the day-to-day practice of medicine. For example, the medical scenario can be an interaction between the physician and his/her superior, an interaction between the physician and the head of accounting at his/her place of employment, an interaction between the physician and a family member of the patient, an interaction between the physician and a malpractice attorney, an interaction between the physician and a subordinate, an interaction between the physician and an insurance representative, an interaction between the physician and a pharmacist, an interaction between the patient and a receptionist, an interaction between the patient and a family member, etc.

The scenarios encountered by users of the simulation are not limited to interactions within the medical clinic or facility. Further, the scenarios are not limited to interactions with other users or computer controlled avatars. The scenarios can take place in whole or in part at any location within the simulation, and may include any character or three-dimensional construct within the simulation/synthetic world. As an example, a scenario may include a user going to a patient's home to determine whether the patient's walls contain asbestos which may be affecting the patient's health. The scenario may also include going to the patient's virtual neighborhood to determine whether there is pollution present, or to see whether the patient lives near a nuclear power plant, a mosquito-infested pond, or a moldy hay barn. In an exemplary embodiment, augmented reality devices such as personal digital assistants (PDAs), pagers, cellular telephones, etc. can be used in the scenarios to introduce real-world elements and/or tasks into the simulation.

In an exemplary embodiment, the medical scenarios can be in the form of virtual face-to-face interactions, virtual telephone interactions, virtual email interactions, or any other virtual communications. As an example, a physician can receive an urgent page from a pharmacist requesting clarification of a prescription while the physician is in the middle of a face-to-face consultation with a patient. Similarly, the physician can receive an angry phone call from his/her superior while the physician is in the middle of a telephone call with the pharmacist. The physician can also receive telephone calls from laboratory technicians, receive telephone calls from patients, receive letters from medical boards, receive emails from nurses, etc.

Medical scenario engine 310 can provide medical scenarios which are one time occurrences and/or medical scenarios which develop and continue over a period of time. As an example of a one time occurrence, a patient can visit a physician because the patient has an embarrassing rash on his/her arm. The physician can diagnose the rash, prescribe an anti-itch cream to the patient, and tell the patient to return if the rash has not disappeared within ten days. If the diagnosis and prescription were correct, the patient may not return and the physician may not have further contact with the patient.

As an example of a continuing medical scenario, the physician can see a recalcitrant diabetic patient who refuses to eat properly or take medicine. The physician can have a goal of changing the diabetic patient's attitude during visits which occur over a series of days, weeks, or months. The goal can also involve one or more tasks which are outside of the actual physician/patient interactions, but which are related to the physician/patient relationship. For example, the patient may not be able to afford medication. The physician may have to do research to determine how the patient can obtain free or discounted medicine. If the physician does not perform the research and provide the patient with the information, the patient on ensuing visits may become more contentious or withdrawn, may schedule visits more (or less) frequently, may show deteriorating control of his/her disease, or may transfer his/her care to another physician. Alternatively, the physician may have to visit the patient at home to determine that the patient lives in a homeless shelter, that the patient is indigent, and that the reason the patient's condition is not improving is because the patient cannot afford medication. Upon making this determination, the physician can use resources within the simulation to research how the patient can receive free or discounted medication. Medical scenario engine 310 can provide consequences based on the physician's handling of the diabetic patient. For example, if the physician does not properly handle the diabetic patient, the diabetic patient may eventually go into a coma, die, be involved in a car accident due to fainting behind the wheel, or otherwise suffer from his/her illness. However, if the physician is able to turn the diabetic patient around, the diabetic patient can go on to become a successful businessman, an accomplished athlete, or a good student.

In one embodiment, medical scenario engine 310 can provide the physician with a teaser before, during, or after the physician's first meeting with a patient. The teaser can be set in the future and can illustrate consequences which may result from the physician's handling of the patient. For example, the patient can be a 16 year old boy with diabetes who loves to skateboard, but refuses acknowledge his condition or take any medicine to alleviate it. Prior to the boy's first visit with the physician, the physician can be shown a teaser which portrays events that will occur three months in the future if the boy does not begin taking his medicine. The teaser can show the boy preparing to perform in a televised half-pipe skateboarding competition. The boy's family, friends, and girlfriend can be in the stands to cheer for the boy and give him support. The boy can begin his run in perfect form and the crowd can raucously applaud. Toward the end of his run, while in the middle of a difficult mid-air trick, the boy can faint and fall twenty feet, head first to the ground. An ambulance can come and rush the bleeding boy to a hospital as his family loses control. In an exemplary embodiment, use of such a teaser can help the physician become emotionally attached to the patient such that the physician sincerely cares about the patient's welfare. The use of the teaser can also provide incentive to the physician to ensure that the portrayed catastrophe does not come to fruition. The teaser can also be used to teach the physician that his/her performance in the office can have far-reaching effects on numerous lives. In an exemplary embodiment, the teaser can be provided to the user in the form of audio information, video information, textual information, or any other format.

In an exemplary embodiment, the dialog which occurs between participants in a medical scenario can be conveyed through a headset (or other speaker) and microphone worn by the participants in the medical scenario. For example, a patient can use his/her microphone and headset to speak to the physician and hear the actual voice of the physician. Similarly, the physician can use his/her microphone and headset to speak to the patient and hear the actual voice of the patient. In one embodiment, full natural speech language processing may be used, and the user may be able to speak to a computer controlled avatar about any topic within the simulation. Alternatively, domain specific speech recognition may be used such that the user can only speak with the computer controlled avatar about a limited number of topics. For example, if medical domain specific speech recognition is used, the user can converse with a computer-controlled patient about a host of medical topics. However, the user may not be understood by the system if he/she attempts to talk with the computer-controlled patient about baseball. If the user attempts to talk baseball, the computer controlled patient may correct for this by becoming upset, asking the physician to repeat the statement, or steering the physician back to the reason for the visit. A speech analyzer can also be used to analyze the user's voice for evaluation purposes. The speech analyzer can detect nervousness, stress, tone, or any other voice characteristic known to those of skill in the art. These voice characteristics can be used to condition the user/patient interaction. In addition to speech analysis, a camera may be used to capture user movements, expressions, and body language, and the captured information can be attributed to the user's avatar in real time such that the avatar behaves as the user is behaving in the real-world. The captured information can also be used to evaluate the user, to ensure that the user takes the simulation seriously, and to condition the user/patient interaction.

In an alternative embodiment, the dialog which occurs between participants in a medical scenario can be scripted or canned, and in the form of dialog trees. The use of pre-selected dialog can ensure that symptom descriptions and responses to questions are appropriate, regardless of the medical knowledge of the participants. In addition, a dialog which is pre-written by medical professionals can be made to accurately reflect patients based on their age, ethnicity, emotional state, and medical condition. The dialog trees can be implemented in the form of multiple choices from which participants can select. For example, a patient can complain of a symptom through text in a dialog box. The physician can have the choice of asking for more details regarding the symptom, asking how long the symptom has persisted, excusing his/herself to consult with a colleague, or making an immediate diagnosis. The patient's response can be based at least in part on the physician's response, and so on. The patient can be a system user who is also choosing his/her dialog, or a computer controlled patient whose dialog is based on the dialog selections made by the physician.

Dialog trees can alleviate the need for convincing and realistic acting, and can also allow users who speak different languages to interact with one another. Medical training system 300 can include a translating engine such that each participant sees dialog text in his/her native language. Anonymity within medical training system 300 can also be maintained through the use of dialog trees. Anonymity can make it significantly more difficult for users to cheat the system by working together with other users. Dialog trees can also simplify the assessment of participants. Medical training system 300 can know which dialog choices are sub-optimal, and evaluate participants accordingly. In one embodiment, the medical training system can have a plurality of modes. A beginner mode may use dialog trees, and intermediate or advanced modes may use free form speech.

In an exemplary embodiment, player emotions and/or feelings can be graphically modeled during a medical scenario. Graphical models of emotions and feelings can be used in embodiments which utilize dialog trees and/or in embodiments which utilize free form speech. For example, during an interaction between a physician and a patient, the physician may be able to see a graphical representation of a trust level of the patient. The physician can also see how his/her responses to the patient affect the trust level. If the physician answers a question in a way that avoids the question, the trust level can decrease. Conversely, if the physician takes five minutes to provide a thorough explanation to the patient, the trust level can increase. In an exemplary embodiment, any other feelings and/or emotions, including anger, nervousness, fear, joy, happiness, morale, and so on, can also be graphically represented. In one embodiment, patients may be able to see a graphical model of the emotions and/or feelings of their physicians. In another alternative embodiment, graphical models can be used in medical scenarios involving interactions between a physician and his/her superior, a physician and a colleague, a patient and a receptionist, or any other medical scenarios. Alternatively, any or all physician and patient characteristics can be conveyed through body language, facial expressions, speech, etc.

In one embodiment, physicians may be prompted if a patient or other avatar with whom they are interacting supplies partial or misinformation, or is otherwise untruthful. The prompt can be a color indicator, a textual message, or any other type of indication. As an example, the physician may ask a patient if he gets any regular exercise throughout the course of an average day. The patient may respond that of course he does. The physician may be informed (through a text box, pop-up window, audio message, color indicator, etc.) that in truth, the only exercise that the patient gets is walking from his couch to his refrigerator. The physician can use such information to flush out the truth from the patient, to diagnose the patient, and/or to prescribe a treatment for the patient. The truthful information can also be used to allow the physician to better understand patient motivations and patient insecurities. In an exemplary embodiment, prompts regarding the truth underlying a physician/patient interaction may only be provided to novice users within a beginner mode. More advanced users may be expected to determine whether a patient is lying without any prompts or hints.

In one embodiment, an enhanced scenario replay may be used to provide feedback to the physician after the medical scenario. In an enhanced scenario replay, arrows or other indicators can point to body language, facial expressions, etc. of the patient that should have cued the physician to the patient's internal state. The physician can click on the arrows to view additional information regarding the specific body language, facial expression, etc. Alternatively, a live tutor or professor can go through a replay of the interaction with the user and explain any cues or other information which the user missed. In another alternative embodiment, a live tutor or professor can accompany the user within the medical scenario and stop the scenario at critical times to point out important cues/information which the user missed.

Reference engine 315 can be used to provide a full spectrum of psychobiosocial medical information to physicians in the medical simulation. The medical information can be provided by content experts in timely, synopsized, and contextualized form. Alternatively, the medical information may be provided through links to real-world data sources such as an online encyclopedia. The medical information can be used as a resource for diagnosing illnesses, identifying problems, recommending treatments, successfully solving challenging problems posed in physician/patient interactions, etc. Physicians can access the medical information through virtual computer terminals within the medical simulation, through a pop-up screen, or by any other method. The medical information can be also be in the form of access to biomedical journals, textbooks, and other medical publications. The medical information can also be in the form of links to medical websites. In one embodiment, the medical information which is accessible may depend on the user and/or the version of the medical simulation. For example, a user who is a member of the general public may receive links to medical websites, a user who is a medical student may receive online textbooks, and a user who is a practicing physician may receive medical journals, textbooks, and encyclopedias. The medical information provided may also depend on a level of experience of the user. For example, a novice user may be provided with detailed, complete, and easily accessible information from a single source. A more advanced user may be forced to utilize a plurality of sources to find desired information such that real-world research is emulated. In one embodiment, reference engine 315 can allow users to customize a virtual terminal or other access point such that the medical information is organized into a personal library. In an alternative embodiment, medical information may not be provided to users such that users are forced to rely on their own medical knowledge.

In an exemplary embodiment, medical training system 300 may not require user physicians to diagnose their patients because diagnosis is a skill which can be adequately taught in medical school. Rather, a primary focus of medical training system 300 can be to enhance the ability of physicians (or physicians in training) to successfully interact with patients. As such, once physicians ask patients the proper questions and perform the proper tests, diagnosis engine 320 can be used to provide users with a diagnosis based on the patient symptoms. Diagnosis engine 320 can be used as an alternative to, or in conjunction with reference engine 315, depending on the embodiment. In one embodiment, diagnosis engine 320 may be used only in specific versions the medical simulation, or only for specific users. For example, diagnosis engine 320 may be available for a user from the general public and a user in his/her first year of medical school, but not for a user who is a practicing physician seeking continuing medical education credits.

Consultation engine 325 can allow a user to consult with other users of the medical simulation, with live medical experts, with computer generated tutoring agents, etc. For example, a user may wish to speak with other users regarding how to handle a patient who is lying, a superior who is suggesting unethical conduct, a problematic pharmacist, etc. Users can also consult with live, real-world expert consultants who may variously be represented as avatars, through video, and/or through audio. As an example, a medical student user may be able to consult with one of his/her professors, a practicing physician, or a medical specialist. Other experts which may be accessible through the medical simulation can include psychologists, social scientists, medical anthropologists, population health experts, and so on. Consultations can take place in the form of a virtual chat room with actual speech, through text messages, through virtual telephone calls, or by any other method of communication. In one embodiment, the medical simulation can include a virtual conference room in which users can go to seek help, information, and guidance from other users. The virtual conference room may exist as a component of the Electronic Health Record (EHR) system within the simulation. Alternatively, the virtual conference room may be a three-dimensional construct within the simulation that exists apart from the EHR, and which features a virtual computer terminal (i.e., information portal) or other construct through which users can readily access information.

Capture engine 330 can capture and store data corresponding to events which occur in the medical simulation. The captured data can be performance data used to evaluate users and/or any other data which tracks users' actions within the medical simulation. In one embodiment, capture engine 330 can store all interactions which occur in the medical simulation such that the interactions can be replayed and reviewed. The replay of an interaction can be from any perspective such that a user can view facial expressions and body language of his/her avatar or such that a professor can simultaneously view all participants in the interaction. Users may also be able to view replays of medical scenarios in which they did not participate such that the users can learn from the mistakes and successes of other users.

In an exemplary embodiment, data stored by capture engine 330 can be used by medical training system 300, a professor, a medical board, or any other entity to grade users based on their performance during a medical scenario. Capture engine 330 may also be used to capture timing information of events which occur within the medical simulation. Timing information can include the amount of time it takes for a physician to make a diagnosis, whether the physician or patient is late for an appointment, the length of an appointment, an amount of time which the physician waits for a silent patient to speak, an amount of time spent listening to the patient, etc. Capture engine 330 can also be used to capture and store questions asked during consultation, medical reference materials, journal articles, etc. used to make a diagnosis, user actions within the simulation which occur apart from the actual physician/patient interaction, and any other information associated with the simulation.

Assessment engine 335 can be used by medical training system 300 to provide an assessment of users based on their performance in the medical simulation. The assessment can be based on responses made during medical scenarios, answers to questions, punctuality, responsiveness, a rate of patient satisfaction, etc. Assessment engine 335 can also be used to determine whether a user has satisfied a goal. If the user satisfies the goal, assessment engine 335 can increase the user's status, increase the user's salary, increase the user's skill level(s), promote the user, or otherwise reward the user within the medical simulation. As such, the medical simulation provides users with an experiential, constructivist learning model. In one embodiment, the assessment can be made at least in part by a professor or other evaluator of the user, and assessment engine 335 can receive assessment data from the evaluator. For example, assessment engine 335 and/or capture engine 330 can allow a professor to view, annotate, and otherwise comment upon a medical student user's performance during a medical scenario. If the user's performance was satisfactory and/or a goal was met, assessment engine 335 can increase the user's status accordingly.

Assessment engine 335 can also be used to determine and cause consequences within the simulation based on actions of the user within the simulation as he/she drives toward an ultimate or overarching goal. The consequences can be based on the handling/treatment of patients during patient interactions, information conveyed to patients, acts performed outside of patient interactions such as visiting the patient's home, responsiveness to patient telephone calls, the amount of effort placed in finding a solution for patients, and/or any other actions taken by the user within the simulation. As such, assessment engine 335 is a dynamic, iterative engine which can be used to alter a user's experience within the simulation by generating consequences that help the user to better understand the benefits or problems involved with the use of different strategies/techniques. The consequences can also be used to ensure that the user receives experience in areas where the user has performed poorly in the past.

Financial engine 340 can be used to track finances within the medical simulation. A user may be a clinic manager whose goal is to operate the clinic on a specific budget. Financial engine 340 can be used to keep track of the budget, keep track of clinic income, keep track of clinic expenditures, keep track of clinic liabilities and bills, and any other financial information of the clinic. Financial engine 340 can also be used to keep track of salary and expenses for individual users such that the user's financial status can be monitored. In one embodiment, financial status of individual users can be used in part to determine an overall quality of living for the users within the medical simulation. Financial engine 340 can also be influenced by assessment engine 335 based on the user's actions within the simulation. For example, a user's actions may impact patient satisfaction, patient waiting times, and the stress of nurses or other clinic personnel, and clinic revenue may be impacted accordingly. If patients are happy and there is a satisfied staff with low turnover, clinic revenue may be high. If patients are unhappy, they may not return, and the clinic revenue may be low. Financial engine 340 may also be used to economically represent a variety of different healthcare systems such that users can obtain experience in different settings. For example, financial engine 340 may be used to represent a free market healthcare system, any of a variety of socialized healthcare systems, or any other type of healthcare system. In one embodiment, users may be allowed to alter healthcare policy assumptions within the simulation to see how various policies affect the economics of the healthcare system. In an alternative embodiment, financial information may not be considered within the medical simulation.

External engine 345 can be used by medical training system 300 to model any outside influences which can potentially affect physicians and/or medical settings within the medical simulation. External engine 345 can be used to show how natural disasters, terrorist attacks, and other catastrophic events can affect operations within a medical setting. External engine 345 can also be used enforce legal obligations of physicians and the medical settings in which they work. External engine 345 can be used to implement changes in health regulations which may result from governmental or internal action. External engine 345 can also introduce the element of competition such that one or more clinics, hospitals, or private practices compete against one another for patients within a specific region. External engine 345 can also model relationships between clinics and health insurance companies, relationships between physicians and malpractice insurance carriers, relationships between clinics and professional associations, relationships between physicians and professional associations, and so on.

Personal life engine 350 can be used by medical training system 300 to control any aspect of the personal lives of users within the medical simulation. For example, users can have homes, families, vehicles, relatives, chores, hobbies, pets, and so on within the medical simulation. As such, users can get a feel for what it is like to live the life of a physician and/or a patient. In one embodiment, the personal life engine 350 may be used in only certain versions or only for specific users of the medical simulation. For example, detailed personal lives may be an option in a medical simulation designed for the general public, but not for a medical simulation designed for practicing physicians who are trying to obtain continuing medical education credits. In an alternative embodiment, personal life engine 350 may not be used, and the medical simulation may focus solely on the professional lives of physicians.

In an alternative embodiment, medical training system 300 may also include a body language engine. The body language engine can ensure that an avatar's facial expressions, posture, and other body language is appropriate to what the avatar is saying and what the avatar is feeling. For example, the body language engine can ensure that an avatar who has recently experienced a death in the family appears unenergetic, distant, and melancholy. The body language engine can also control body language based on past interactions and experiences of the avatar. For example, if a prior interaction between a patient avatar and a physician avatar was friendly and productive, the patient avatar can exhibit friendly and happy body language at the commencement of a subsequent interaction with the physician avatar. Similarly, if a prior interaction between the patient avatar and the physician avatar was disastrous, the physician avatar can exhibit nervous and slightly angry body language at the commencement of a subsequent interaction with the patient avatar.

In alternative embodiments, medical training system 300 can also include a registration engine, a goal engine, an emotion engine, an avatar engine, and/or any other engines which can be used to implement the medical simulation. For example, the registration engine can receive registration information from a user and provide the user with access to the medical simulation. The goal engine can create, store, assign, and/or receive goals for the user. The goal engine can also track the user's progress toward achieving the goal. The emotion engine can be used to convey emotions of the avatars based on past and present experiences of the avatars within the simulation. In the case of an avatar representing a live user, these emotions can influence dialog choices presented to the user. In the case of a computer controlled avatar, the emotions can influence dialog used by the avatar. Avatar emotions can also be conveyed non-verbally through body language, expressions, posture, textual indicators, other indicators, etc. Alternatively, emotion can be conveyed through the body language engine. The avatar engine can assign avatars to the user, receive avatar selections from the user, store avatar(s) for the user, and/or enhance the avatars as time progresses and the user increases his/her status. In an alternative embodiment, any or all of the engines described herein can be incorporated into a single medical training engine.

As described above, the medical training system can be used to model a wide variety of interactions which can occur among medical staff, medical management, physicians, patients, emergency medical technicians, receptionists, pharmacists, insurance companies, etc. In an exemplary embodiment, the medical training system can be used as part of a course within a medical school curriculum. The course, which can run for one or more semesters, can require students to attend class for a number of hours each week and participate in the medical simulation for a number of hours each week. During the first class, the professor can talk students through an introductory demonstration of the medical simulation and have the students set up their medical simulation accounts. The students can also be asked to establish their avatars and begin using the medical simulation. Experience within the medical simulation can be gained by performing ramp-up quests, such as making introductions to other avatars within the medical simulation, executing simple tasks within the medical simulation, pulling patient data within the medical simulation, and so on. Alternatively, students can gain experience by meeting with one or more computer controlled patients. Upon gaining a sufficient amount of experience, the student can begin to interact with live and/or simulated patients in the medical simulation. The student can also play the part of a live patient within the medical simulation. During subsequent classes, the professor can show replays of and comment upon particularly good and/or particularly bad physician/patient interactions. Professors can also answer specific questions and provide philosophical guidance regarding the medical simulation.

Over the course, students may be expected to increase their skills in various areas such as interviewing, listening, cultural sensitivity, ethnic sensitivity, religious sensitivity, etc. Users may start with a skill level of 1 in each of a plurality of categories. As a user advances through a structured series of encounters with physicians and patients, his/her skill level can increase based on how the user handles the encounters. The user may be required to attain a specific skill level in each category to pass and/or achieve a certain grade in the course.

If the medical simulation is limited to a single class at an institution, there may be scheduled times during the week when students are encouraged or required to use the medical simulation. If the medical simulation is run across many medical schools, nationwide, or worldwide, usage times may not be scheduled because there will likely always be other available users who are playing the role of patients and physicians.

As an example of a session in the medical simulation, user A may log in as a physician at 4:00. User A may have a varied range of skills, e.g. level 2 in Korean cultural sensitivity, level 3 in interviewing micro-skills, and level 6 in augmented reflective listening. User A may have a scheduled appointment at 4:15 with a patient and a scheduled appointment at 4:35 with a physician. The patient can be computer controlled, or played by another user. Prior to his meeting, user A may go to his office to bring up files regarding the patient. User A can discover that the patient is a 45 year old fish market manager who is coming in for a checkup on his progress controlling a case of diabetes. User A can also be reminded that user A met with the patient a month ago and prescribed a combination of diet change and medication. Blood work done on the patient can indicate that there has not been much improvement in the patient's condition since the last visit. User A can be provided with an indication that the patient is waiting and ready in a designated examination room. User A can cause his avatar to walk to the examination room.

Depending on the embodiment, user A can either speak a greeting to the patient or select a greeting from one or more greeting options. The greeting options may include using the patient's name, refraining from using the patient's name, just saying hello, not using any greeting, offering a handshake, etc. If a live user is playing the role of the patient, the patient can also either speak a greeting to user A or select a greeting from one or more greeting options. The patient's greeting options may be based on the greeting selected by user A. User A can have a goal of understanding if and why the patient has or has not been compliant with his/her medical regimen. The patient may have a goal that conflicts with the goal of user A, such as convincing user A that he/she is complying with his/her diet when in reality the patient is too embarrassed to admit that he/she is confused by the diet. Similarly, the patient may have a goal of convincing user A that the patient is taking his/her medicine when in reality the patient has been laid off, has no health insurance, has only been taking one pill every third day, and is too ashamed to discuss the issue.

Both user A and the patient can be awarded points for their actions during the simulation. For example, user A may be awarded points for helping the patient to discuss his/her dietary noncompliance in a more honest fashion, and additional points for developing an understanding of why the patient did not follow his/her diet. Even if user A is not able to elicit an admission from the patient, user A may still be awarded points for building trust, which may result in a more honest dialog during future patient visits. In one embodiment, the dialog options presented to the users can be based on the user's skill level. For example, if user A has a high cultural sensitivity skill level, user A may be able to accurately empathize with a patient regarding the pressure to eat ethnic foods that adversely affect the patient's blood sugar, cholesterol, blood pressure, etc. User A may receive points for this technique, and may receive progressively more points if he/she can help the patient re-think his/her diet, set milestones for patient improvement, make referrals to an ethnically-savvy dietician, etc. If user A polarizes the discussion such that the patient tunes the physician out or becomes adversarial, user A may receive negative points, and adverse consequences may result. User A may also be awarded points if he is able to successfully conclude the appointment with the patient well before 4:35 such that he can prepare for and attend his next appointment. A successful conclusion may be achieved if user A does not act rushed or make the patient feel neglected or unimportant.

In an exemplary embodiment, a patient's health within the medical simulation can be represented along an illness trajectory, which can be seen as a two-dimensional representation of the patient's health over time. In another exemplary embodiment, the illness trajectory can be affected by dependent variables associated with patients and independent variables associated with physicians, thus creating a three-dimensional model. Dependent variables of the patient may include anxiety, resistive behaviors, and non-compliance. Independent variables of the physician may include rapport, patient-centeredness, cultural sensitivity, and communication skills. The independent variables associated with the physician can affect the dependent variables of the patient, and the dependent variables can affect the illness trajectory of the patient.

As an example, rapport can be an independent variable associated with a physician and defensive behavior can be a dependent variable associated with a patient. If, during a physician/patient interaction, the physician exhibits good rapport, the defensive behavior of the patient may be lowered. Because the defensive behavior is lowered, the patient may more closely follow his/her medical regimen, and the patient's health may increase over time. The interactions of these variables and the resulting health implications are an expression of the three-dimensional illness trajectory model described above. Conversely, if the physician has poor rapport, the patient's defensive behavior may increase or remain unaltered, and the illness trajectory may reflect a decrease in the patient's health. Poor rapport by the physician and the resulting increase in defensive behavior can also result in other consequences within the simulation such as tasks which the physician is asked to perform, the timing of subsequent visits by the patient, the patient's behavior or attitude during a subsequent visit, whether the patient misses a visit, etc.

In an exemplary embodiment, independent variables associated with the physician and/or dependent variables associated with the patient may be made quantifiable through the use of surrogate markers, and measured by a statistical engine. As an example, rapport (i.e., an independent variable associated with the physician which, per se, may be nebulous) may be quantified by x factors, where x can be any value. The factors can include a type of clothing worn by the physician, a color of the clothing worn by the physician, a type of greeting used by the physician, a type of handshake used by the physician, whether the physician makes eye contact with the patient, whether the physician shows up on time for the appointment, specific words used by the physician, etc. During an interaction, the statistical engine can determine how many of the rapport related factors are demonstrated by the physician, and the physician can receive a rapport score. As an example, there may be 15 factors used to quantify rapport, and the physician may be considered to have excellent rapport if he/she demonstrates 12 or more factors during an interaction. Similarly, demonstration of 9-11 factors may be good rapport, demonstration of 5-8 factors may be average rapport, and demonstration of 0-4 factors may be bad rapport. If defensive behavior (i.e., a dependent variable associated with the patient) of the patient is dependent upon the physician's rapport, the defensive behavior can increase or decrease based on the number of rapport factors exhibited by the physician.

Figure 4:
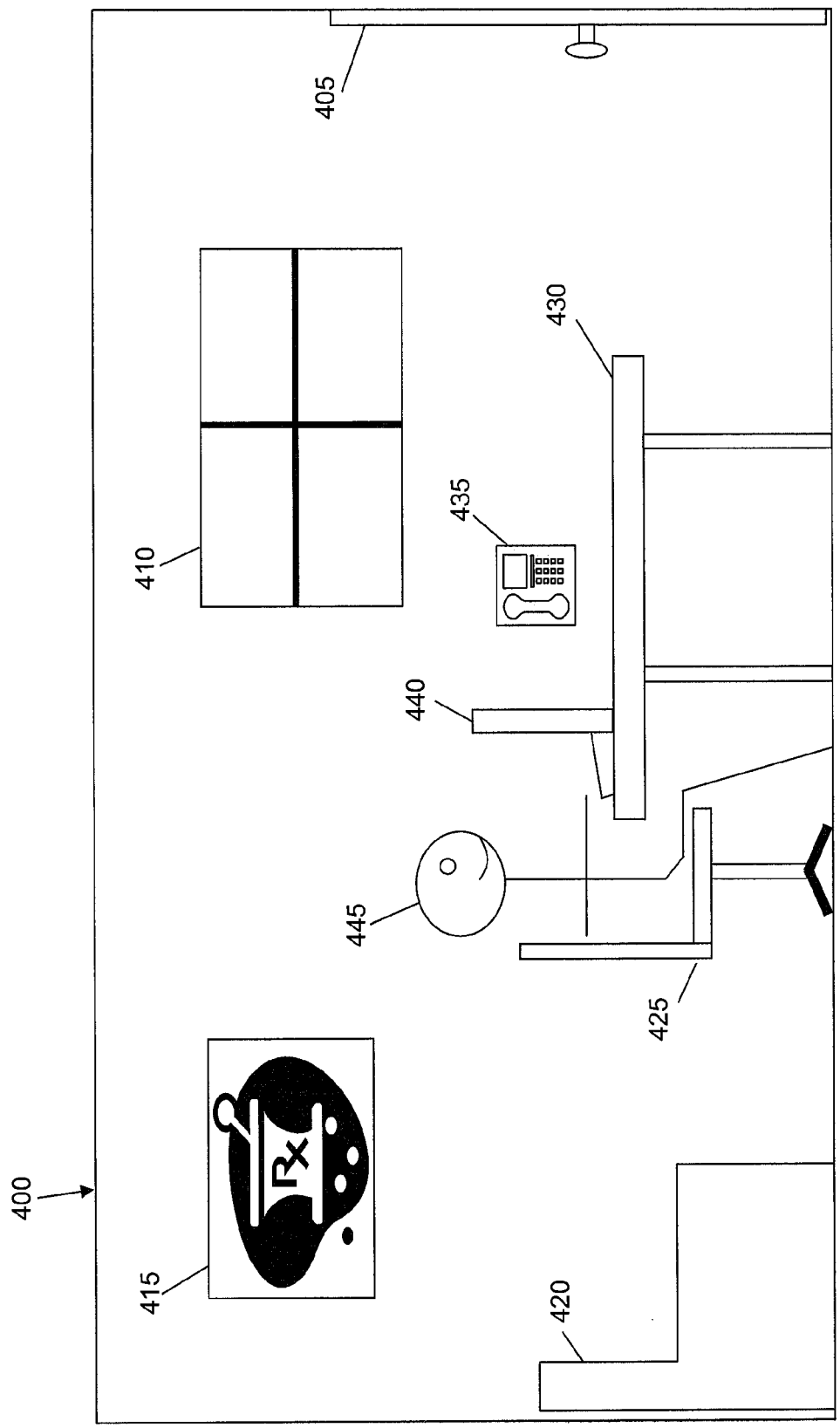
FIG. 4 is a diagram illustrating a physician office in accordance with an exemplary embodiment.

FIGS. 4-8 are diagrams illustrating an exemplary physician/patent interaction within a medical simulation. The diagrams in FIGS. 4-8 are two-dimensional depictions which are used for illustrative purposes. It is important to understand that, in an exemplary embodiment, the medical simulation may be a three-dimensional world in which three-dimensional avatars possess an extensive amount of detail, expression, cognition, emotion, and realism. Further, the three-dimensional world, which can be modeled after the real world, may include numerous avatars with varying attitudes, appearances, goals, and circumstances. FIG. 4 is a diagram illustrating a physician office 400 in accordance with an exemplary embodiment. Physician office 400 includes a door 405, a window 410, artwork 415, a couch 420, a chair 425, a desk 430, a telephone 435, and a computer 440. In alternative embodiments, physician office 400 can include any other furniture, décor, reference materials, etc. such that physician office 400 appears genuine. In an exemplary embodiment, physician office 400 can be within a clinic, hospital, or other medical facility within the medical simulation.

A physician avatar 445 can be played by a user. Physician avatar 445 can be a three-dimensional avatar which exhibits emotion and realistic facial expressions. Physician avatar 445 can also exhibit confidence, or a lack thereof, based on the accumulated learning experiences of the user within the medical simulation. For example, physician avatar 445 may exhibit a low confidence level and/or low self esteem if the user has performed poorly in previous physician/patient interactions. Similarly, physician avatar 445 may exhibit a high confidence level and/or high self esteem if the user has excelled in previous physician/patient interactions. Confidence level, self esteem, mood, emotion, etc. can be portrayed through realistic facial expressions, gestures, posture and/or other body language of physician avatar 445. Alternatively, any or all of confidence level, self esteem, mood, emotion, etc. can be portrayed through visible gauges, meters, or other indicators. The gauges, meters, or other indicators may be visible to only the user controlling physician avatar 445, to a subset of users, or to all users, depending on the embodiment. In an exemplary embodiment, avatar 445 can be created and/or represented through any combination of real time video capture, real time audio capture, real time motion capture, full animation, the use of animation toolsets that automate the animation process, etc.

In an exemplary embodiment, the user can log into the medical simulation and begin preparing to meet with a patient or perform other tasks. In one embodiment, physician avatar 445 can start in physician office 400 upon login. Alternatively, physician avatar 445 can be in a home, in an apartment, in another part of the medical facility, or anywhere else within the medical simulation upon login. If physician avatar 445 does not start in physician office 400, physician avatar 445 can walk, bike, drive, etc. its way to physician office 400. In one embodiment, use of an office such as physician office 400 may be limited to a subset of users within the medical simulation. For example, use of physician office 400 may be a reward or privilege based on experience and progress made within the medical simulation. Users without offices can be provided cubicles, common areas, or other areas which provide the functionality of an office such that the users can receive correspondence, learn about patients, prepare for patients, etc.

In an exemplary embodiment, physician office 400 can be a location in which physician avatar 445 can prepare to meet with patients. If physician avatar 445 has not previously met with a patient, physician avatar 445 can use computer 440 to obtain general information about the patient, the patient's medical history, and the reasons for the patient visit. In one embodiment, physician avatar 445 can use computer 440 to experience a teaser related to the patient. The teaser can provide physician avatar 445 with information regarding the patient's past, lies that the patient has told or may try to tell, and/or potential consequences which may be realized in the future if treatment of the patient is successful or unsuccessful. In addition, if physician avatar 445 has previously met with the patient, physician avatar 445 can use computer 440 to recall what occurred in previous visit(s). Physician avatar 445 can use telephone 435 to receive audio information from nurses and other physicians, to receive alerts, to speak with patients, to speak with pharmacists, to obtain assistance from other users and/or experts, etc. Physician office 400 may also include a pager, personal digital assistant, cellular telephone, or other communication devices such that physician avatar 445 can send/receive e-mails, pages, voicemails, text messages, etc. both inside the simulation and between the simulation and real world.

Figure 5:
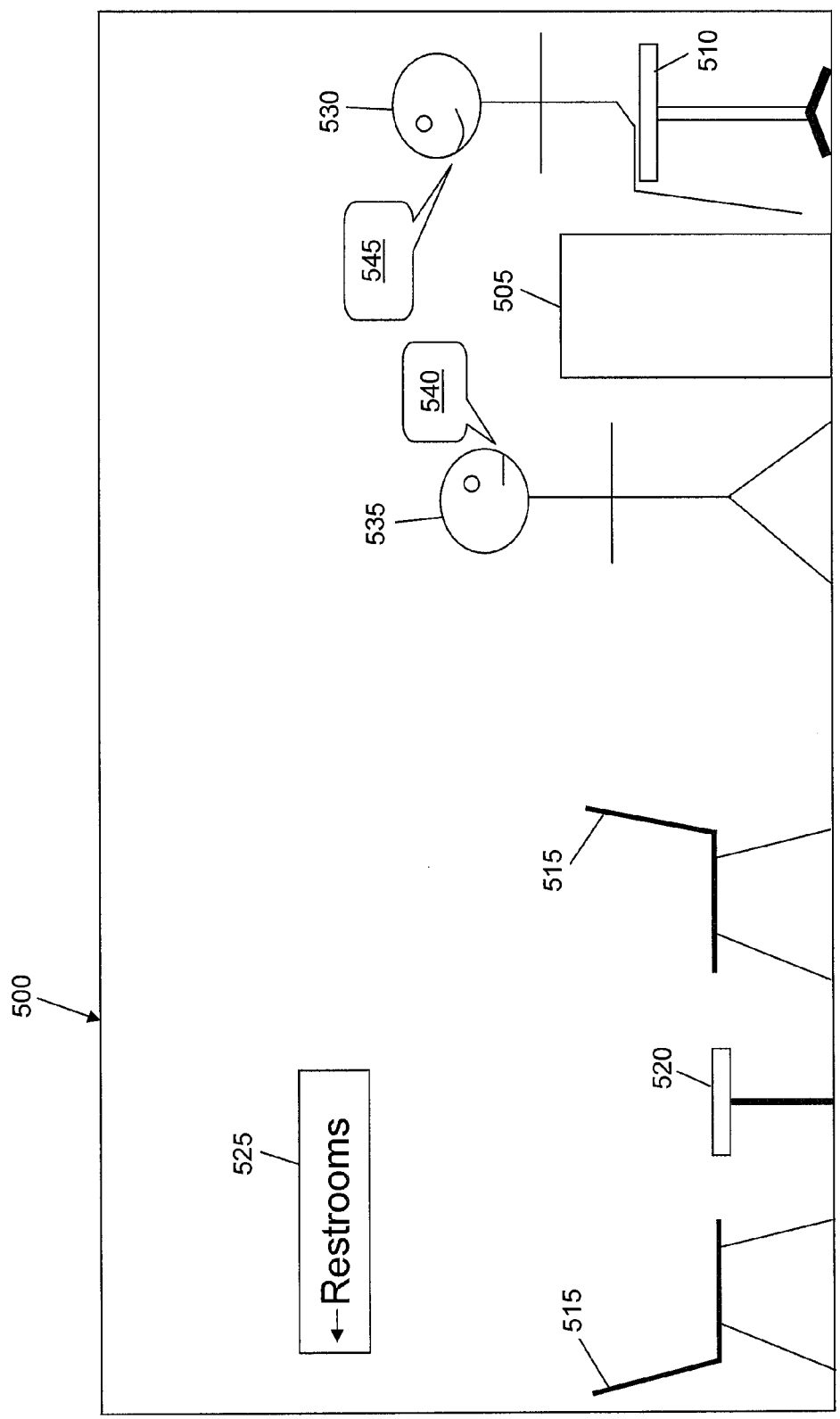
FIG. 5 is a diagram illustrating a reception area in accordance with an exemplary embodiment.

FIG. 5 is a diagram illustrating a reception area 500 in accordance with an exemplary embodiment. Reception area 500 includes a reception desk 505, a receptionist stool 510, chairs 515, a magazine stand 520, and a restrooms sign 525. In an alternative embodiment, reception area 500 can also include vending machines, restrooms, televisions, a fish tank, or any other items likely to be found in a genuine reception area. Patients checking in to the medical facility can wait in chairs 515 and/or read magazines from magazine stand 520 while waiting to be called to an exam room. The magazines can include links to real-world magazines, health related websites, medical information, or any other information. A receptionist avatar 530 is seated on receptionist stool 510 to help patients check in to the medical facility. In an exemplary embodiment, receptionist avatar 530 can be a computer controlled avatar. Alternatively receptionist avatar 530 can be controlled by a user. Regardless of whether receptionist avatar 530 is computer or user controlled, receptionist avatar 530 can exhibit realistic facial expressions and emotion, including impatience, friendliness, sincerity, anger, etc.

A patient avatar 535 can check in to the medical facility with the assistance of receptionist avatar 530. In an exemplary embodiment, patient avatar 535 can be played by a user. During check in, patient avatar 535 can provide personal information, insurance information, billing information, or any other information which is generally provided upon checking into a medical facility. In one embodiment, if patient avatar 535 has previously visited the medical facility, patient avatar 535 can review the results of any past meetings during the check in procedure. Patient avatar 535 can also be briefed during check in regarding how to act and/or what to say during an upcoming meeting with the physician.

In an exemplary embodiment, patient avatar 535 can exhibit emotion, facial characteristics, and/or other traits based on medical condition, experiences during past meetings with the physician, and/or occurrences unrelated to the medical problem. For example, patient avatar 535 can exhibit sadness because of the death of a pet. Alternatively, patient avatar 535 may exhibit fear because the physician was mean and aggressive during a past visit. Alternatively, patient avatar 535 may act arrogant, condescending, or skeptical because the physician made a mistake during a past visit. Thus, it can be seen that the medical simulation is a dynamic environment in which the present behavior and/or feelings of patient avatar 535 may be based on an accumulation of past occurrences and/or present circumstances.

In an exemplary embodiment, patient avatar 535 and receptionist avatar 530 can communicate to one another through dialog boxes. Patient avatar 535 can speak through a dialog box 540 and receptionist avatar 530 can speak through a dialog box 545. Depending on the embodiment, dialog box 540 and dialog box 545 may be visible to all users, may be visible to only a subset of users, or may be visible only to patient avatar 535 and receptionist avatar 530. Alternatively, dialog may be shown at a top of a computer screen through which the medical simulation is accessed, at a bottom of the computer screen, at a side of the computer screen, etc. In an alternative embodiment, patient avatar 535 may communicate through natural speech, and receptionist avatar 530 may respond through computer generated speech. In such an embodiment, domain specific speech recognition may be used, and the scope of the conversation may be limited to ensure that the speech of patient avatar 535 can be accurately recognized such that receptionist avatar 530 can respond appropriately. Alternatively, full natural speech processing may be used such that conversation is not limited.

The following is an exemplary description of an interaction between patient avatar 535 and receptionist avatar 530. Receptionist avatar 530 can be in a good mood because all clinic staff was recently given a raise. Patient avatar 535 can be impatient and slightly angry because of a previous bad experience at the medical facility and a general dislike of the medical profession. Patient avatar 535 can be in line behind other patient avatars (not shown) attempting to check in. When patient avatar 535 is first in line, receptionist avatar 530 can say "next please." Patient avatar 535 can step up to reception desk 505 and receptionist avatar 530 can smile at patient avatar 535 and say "hello, is this your first time seeing us?". Patient avatar 535 can exhibit an impatient facial expression and answer "no, I have been here several times in the past." Receptionist avatar 530 can continue smiling at patient avatar 535 and say "last name please." Patient avatar 535 can say and/or spell the requested last name. If patient avatar 535 does not need to prepare for the upcoming physician visit, receptionist avatar 530 can smile and say "thank you, please have a seat in the waiting area and your name will be called shortly." Alternatively, patient avatar 535 may be provided with the option to prepare for the physician visit. In an exemplary embodiment, each interaction between a patient and a receptionist interaction can be different. For example, next time patient avatar 535 checks in, patient avatar 535 may be in a good mood, and receptionist avatar 530 may exhibit anger because of problems at home.

Once patient avatar 535 is checked in, patient avatar 535 can walk around reception area 500, use a restroom (not shown), purchase a snack from a vending machine (not shown), sit in one of chairs 515, read a magazine from magazine stand 520, etc. At any time after check in, a nurse or other staff member can contact patient avatar 535 and escort patient avatar 535 to an exam room. When patient avatar is in the exam room and ready to be examined, an alert can be provided to physician avatar 445 described with reference to FIG. 4. The alert can be a page, a telephone call, a text message, an e-mail, a pop-up text box, etc. Alternatively, an alert may not be provided, and physician avatar 445 may be expected to go to the exam room at the time scheduled for the appointment.

Figure 6:
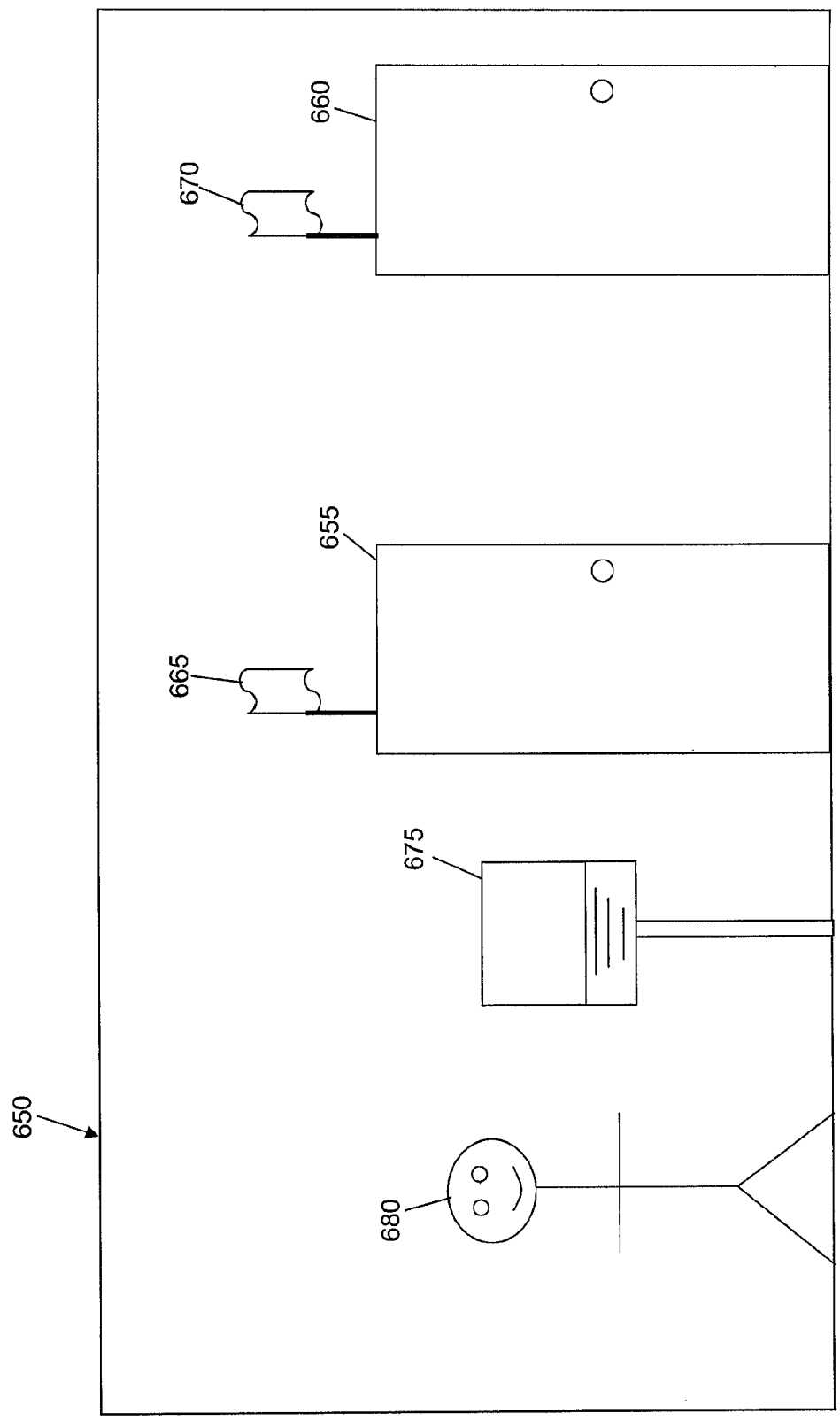
FIG. 6 is a diagram illustrating a corridor within the medical facility in accordance with an exemplary embodiment.

FIG. 6 is a diagram illustrating a corridor 650 within the medical facility in accordance with an exemplary embodiment. Within corridor 650 is a first exam room door 655 and a second exam room door 660. First exam room door 655 can include a first flag 665 to indicate the status of the first exam room. Similarly, second exam room door 660 can include a second flag 670 to indicate the status of the second exam room. As described above, first flag 665 and second flag 670 can be used to provide users with visual cues indicating the status of the exam rooms along corridor 650. The visual cue can be a color of the flag, a position of the flag, a shape of the flag, etc. The status may be an indication that the exam room is occupied by a patient, unoccupied, in need of cleaning, ready for a patient, occupied by a nurse, occupied by cleaners, etc. Corridor 650 can also include a computer terminal 675 such that users can access the EHR system, access information, and/or communicate with other users. A nurse avatar 680 can summon patient avatar 535 described with reference to FIG. 5 when an exam room is ready. Nurse avatar 680 can be a live user or a computer controlled avatar. Nurse avatar 680 can communicate with patient avatar 535 and/or physician avatar 445 according to any of the communication methods described herein.

Figure 7:
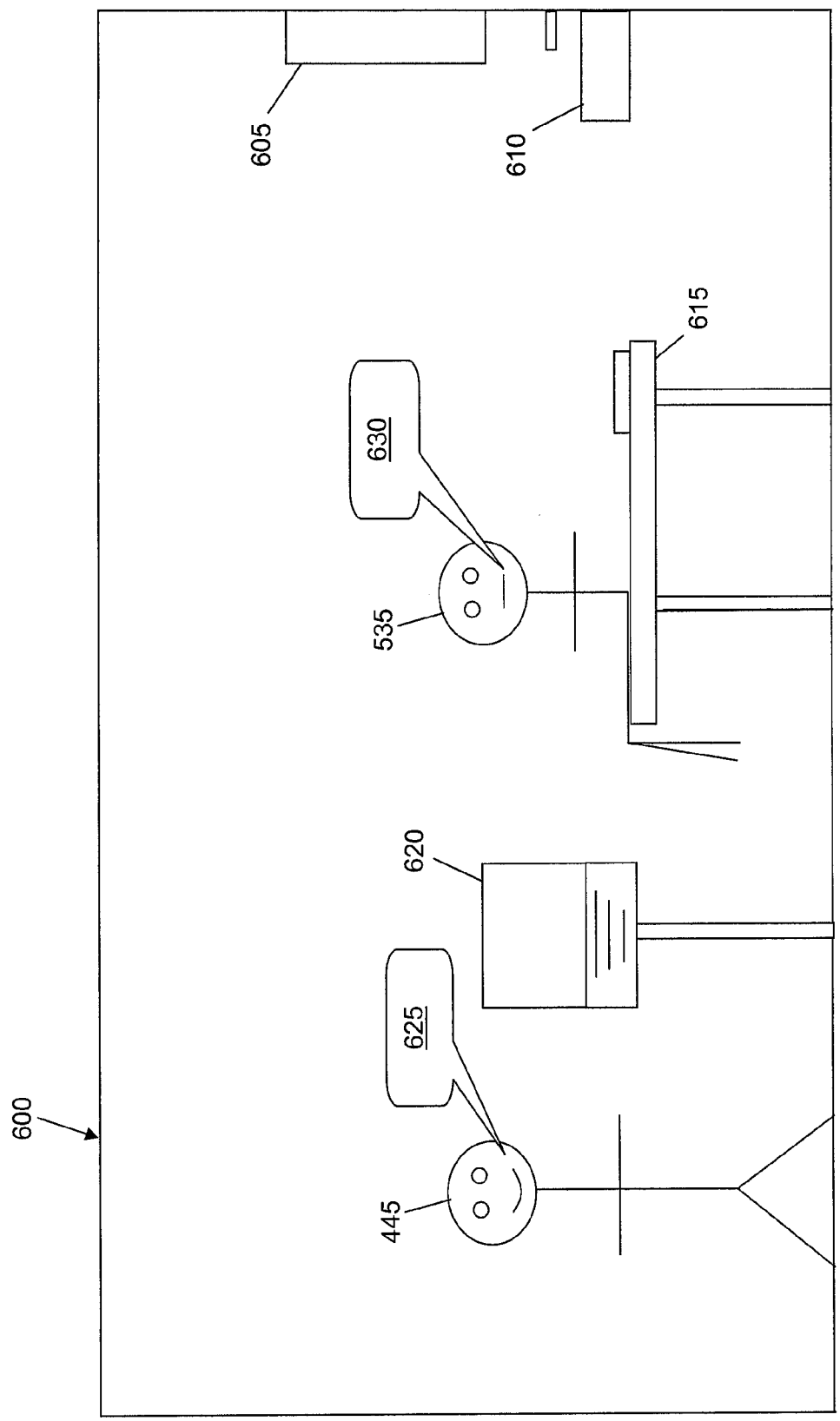
FIG. 7 is a diagram illustrating an exam room in accordance with an exemplary embodiment.

FIG. 7 is a diagram illustrating an exam room 600 in accordance with an exemplary embodiment. Exam room 600 includes a medicine cabinet 605, a sink 610, an examination table 615, and a computer terminal 620. In alternative embodiments, exam room 600 can include any other items likely to be found in a genuine exam room. Physician avatar 445 can communicate through a dialog box 625, and patient avatar 535 can communicate through a dialog box 630. In an exemplary embodiment, the users playing physician avatar 445 and patient avatar 535 can each select dialog from a plurality of dialog choices. Alternatively, patient avatar 535 may be computer controlled, and the computer can select dialog based on the dialog used by physician avatar 445. The dialog choices can be crafted by medical professionals who have substantial experience in physician/patient interactions. As such, each interaction within the medical simulation can be tailored to emphasize a specific circumstance and teach one or more specific skills. This tailoring allows medical students and young doctors to attain the equivalent of years of knowledge and experience through the medical simulation without making mistakes with real patients. In an alternative embodiment, the medical simulation can include language processing software such that natural speech can be used instead of dialog boxes.

As described above, present interactions involving patient avatar 535 can be based in large part on past interactions and present circumstances of patient avatar 535. Similarly, present interactions involving physician avatar 445 can be based in large part on the learning experiences of physician avatar 445 within the medical simulation. As such, physician avatar 445 can develop and change as the medical simulation progresses. For example, if a previous meeting between patient avatar 535 and physician avatar 445 was friendly and successful, physician avatar 445 may exhibit confidence and friendliness during a present meeting with patient avatar 535. Alternatively, present behaviors, expressions, and emotions may be based on the sum of the experiences of physician avatar 445 within the medical simulation. For example, if physician avatar 445 has had more unsuccessful interactions than successful interactions, physician avatar 445 may exhibit nervousness, fear, and hesitation, regardless of whether the last interaction between physician avatar 445 and patient avatar 535 was successful.

Figure 8:
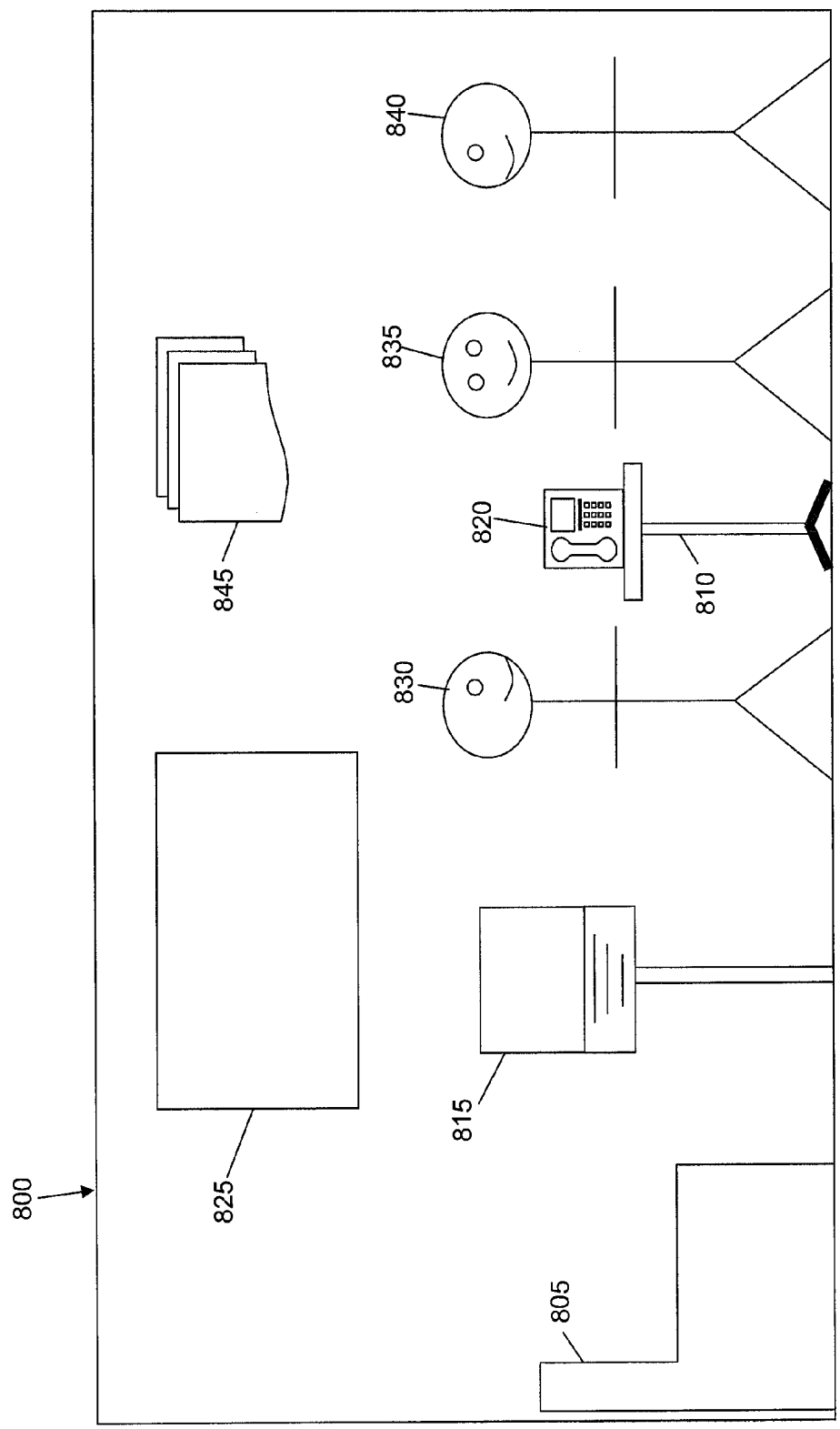
FIG. 8 is a diagram illustrating a virtual conference room in accordance with an exemplary embodiment.

FIG. 8 is a diagram illustrating a virtual conference room 800 in accordance with an exemplary embodiment. Virtual conference room 800 can allow a plurality of users to simultaneously review patient or any of a host of other information, consult an expert, hold a roundtable discussion, or otherwise communicate with one another. Virtual conference room 800 includes a couch 805 and a table 810. Virtual conference room 800 can also include chairs, vending machines, decorations, artwork, windows, doors, and/or any other objects commonly found in a real-world conference room. Virtual conference room 800 also includes a computer terminal 815 such that users can access information and/or communicate with other users. A conference phone 820 can be used by users to receive audio data from patients, experts, professors, or other individuals. A video screen 825 can be used to provide video and/or textual information to users. Video screen 825 can also be used to hold video conferences with patients, experts, or any other individuals within the simulation.

Virtual conference room 800 includes a first avatar 830, a second avatar 835, and a third avatar 840. In an exemplary embodiment, first avatar 830, second avatar 835, and third avatar 840 can communicate with one another by any of the communication methods described herein. First avatar 830, second avatar 835, and third avatar 840 can also communicate with other individuals through computer terminal 815, conference phone 820, video screen 825, and/or any other communication device such as a pda, cellular telephone, pager, etc. As an example, first avatar 830 may be a radiation oncologist for a patient, second avatar 835 may be a primary doctor of the patient, and third avatar 840 may be a social worker who is working with the patient. The radiation oncologist, the primary doctor, and the social worker can discuss the patient with one another. The radiation oncologist, primary doctor, and social worker can also speak with a bioethics expert (not shown) through video screen 825 to obtain information regarding treatment of the patient.

Video conference room 800 also includes a data store 845. Data store 845 can include a variety of information regarding a medical topic, a patient, a physician, a facility, etc. Data store 845 can include a plurality of tabs such that specific information can be readily accessed and displayed. The information can be displayed on video screen 825 or a separate data screen (not shown). As an example, first avatar 830, second avatar 835, and third avatar 840 may be discussing a patient, and data store 845 may include information regarding the patient. A first tab of data store 845 may include x-rays of the patient, a second tab of data store 845 may include the results of laboratory work done on the patient, a third tab of data store 845 may include billing information associated with the patient, a fourth tab of data store 845 may include personal information of the patient, a fifth tab of data store 845 may include links to medical resources such as websites and journals, a sixth tab of data store 845 may initiate a connection with an expert or other consultant, etc. In an exemplary embodiment, users can select a tab of data store 845 to display the information included within the tab. Tabs may be selected by causing the avatar to touch the tab, by entering a command, or by any other method. In alternative embodiments, data store 845 may be constructed as a rotating data wheel, as a table, or as any other type of data structure which is accessible to the users.

The description with reference to FIGS. 4-8 is directed toward interactions among physicians, patients, and medical staff. However, the training system described herein is not limited to medical training. In an alternative embodiment, the training system may be used to train law students and attorneys how to successfully interact with clients. In such an embodiment, the training system dialog and/or scenarios within the simulation can be designed by law professors and experienced attorneys such that young attorneys can gain valuable experience without jeopardizing real life client relationships. For example, an attorney avatar may meet with a client avatar who is accused of first degree homicide. The attorney avatar can have a goal of convincing the client avatar that it is best if the client avatar tells the truth. In another interaction, the attorney avatar may meet with a client avatar who is seeking a divorce from her husband. The attorney avatar can have a goal of convincing the client avatar to control her emotions and be respectful towards her spouse while in the courtroom. Countless other scenarios can be used to teach attorneys how to interact with clients in virtually any area of law. In an alternative embodiment, the interaction can be a teacher/student interaction, a coach/player interaction, a manager/employee interaction, a dental hygienist/patient interaction, a nurse/patient interaction, etc.

One or more flow diagrams have been used to describe exemplary embodiments. The use of flow diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method of assessing one or more characteristics pertinent to interpersonal interactions possessed by an individual, the method comprising:
    establishing a simulated environment using at least one computer;
    establishing at least one computer-controlled scenario avatar within the simulated environment using the at least one computer, wherein the at least one computer-controlled scenario avatar has a human appearance and is programmed to exhibit emotional behavior and cognitive behavior emulating a human in response to a user's input received via an input device operably coupled to the computer,
    wherein the user's input comprises a plurality of emotional components and a plurality of cognitive components,
    wherein the at least one scenario avatar's response to the user's input comprises a plurality of emotional components and a plurality of cognitive components, and
    wherein the input device includes an audio input device to capture voice input and an imaging input device to capture body language input;
    presenting a user with at least one scenario within the simulated environment using the at least one computer, wherein the at least one scenario includes an emotional and cognitive interaction between the user and the at least one scenario avatar, and wherein the at least one scenario is selected based upon a state of at least one characteristic pertinent to interpersonal interactions possessed by the user prior to presentation of the at least one scenario;
    capturing the user's input using the at least one input device; and
    using the at least one computer to assess the at least one characteristic pertinent to interpersonal interactions possessed by the user using the captured user input.

2. The method according to claim 1, wherein the step of using the at least one computer to assess the at least one characteristic pertinent to interpersonal interactions possessed by of the user comprises:
    providing at least one evaluation criterion defining a performance goal; and
    comparing the captured user input to the at least one evaluation criterion to assess whether the user achieved the performance goal.

3. The method according to claim 1, wherein the at least one characteristic comprises a professional competency of the user.

4. The method according to claim 3, wherein the step of presenting a user with at least one scenario comprises selecting at least one scenario based upon a level of the professional competency of the user prior to presentation of the at least one scenario.

5. The method according to claim 1, wherein the step of presenting a user with at least one scenario comprises:
   presenting the user with a first scenario based at least in part upon the at least one characteristic to be assessed prior to presentation of the first scenario; and
   presenting the user with a second scenario based at least in part upon the assessment of the at least one characteristic using the captured user input responsive to the first scenario.

6. The method according to claim 1, wherein the step of presenting a user with at least one scenario comprises:
   presenting the user with a series of scenarios related to the at least one characteristic to be assessed,
   the series of scenarios including a first scenario and a plurality of follow-on scenarios,
   wherein each of the plurality of follow-on scenarios is based at least in part upon the captured user input responsive to at least one prior scenario.

7. The method according to claim 6, wherein each of the plurality of follow-on scenarios is based at least in part upon the captured user input responsive to the immediately prior scenario.

8. The method according to claim 1, wherein the plurality of emotional components and the plurality of cognitive components of the user input comprises the user's nonverbal behavior.

9. The method according to claim 1, wherein the plurality of emotional components and the plurality of cognitive components of the user input comprises an element of the user's speech prosody.

10. The method according to claim 1, wherein the plurality of emotional components and the plurality of cognitive components of the user's input comprises at least one voice analysis input captured using at least one audio input device operably coupled to the computer.

11. The method according to claim 10, wherein the at least one voice analysis input is selected from the group consisting of a user stress level, a user nervousness level, and a user tone of voice.

12. The method according to claim 1, wherein the plurality of emotional components and the plurality of cognitive components of the user's input comprises at least one nonverbal input.

13. The method according to claim 12, wherein the at least one nonverbal input comprises a psychometric input.

14. The method according to claim 1, wherein the at least one body language input comprises at least one facial expression input.

15. The method according to claim 14, wherein the at least one facial expression input comprises user eye movement.

16. The method according to claim 15, wherein the user eye movement comprises eye contact.

17. The method according to claim 1, wherein the plurality of emotional components and the plurality of cognitive components of the user's input comprises a timing of an interaction between the user and the at least one computer-controlled scenario avatar.

18. The method according to claim 1, wherein the plurality of emotional components and the plurality of cognitive components of the at least one computer-controlled scenario avatar's response comprises a tone of voice in which the at least one computer-controlled scenario avatar speaks.

19. The method according to claim 1, wherein the plurality of emotional components and the plurality of cognitive components of the at least one computer-controlled scenario avatar's response comprises a stress level experienced by the at least one computer-controlled scenario avatar expressed in one or more of a tone of voice in which the at least one computer-controlled scenario avatar speaks and body language exhibited by the at least one computer-controlled scenario avatar.

20. The method according to claim 1, wherein the plurality of emotional components and the plurality of cognitive components of the at least one computer-controlled scenario avatar's response comprises a nervousness experienced by the at least one computer-controlled scenario avatar expressed in one or more of a tone of voice in which the at least one computer-controlled scenario avatar speaks and body language exhibited by the at least one computer-controlled scenario avatar.

21. The method according to claim 1, wherein the plurality of emotional components and the plurality of cognitive components of the at least one computer-controlled scenario avatar's response comprises body language exhibited by the at least one computer-controlled scenario avatar.

22. The method according to claim 21, wherein the body language comprises a facial expression exhibited by the at least one computer-controlled scenario avatar.

23. The method according to claim 22, wherein the facial expression comprises eye movement of the at least one computer-controlled scenario avatar.

24. The method according to claim 1, wherein the at least one characteristic pertinent to interpersonal interactions possessed by the user is selected from the group consisting of: values; empathy; client-centeredness; professionalism; interviewing skills; communication skills; professional skills; and rapport.

25. The method according to claim 1, wherein the simulated environment comprises an open world environment.

26. A system for assessing one or more characteristics pertinent to interpersonal interactions possessed by an individual, comprising:
   a setting processor configured to establish a simulated environment;
   a scenario processor configured to present at least one scenario within the simulated environment to a user of the system, wherein the scenario includes emotional and cognitive interaction between the user and at least one computer-controlled scenario avatar, wherein the at least one scenario is selected based upon a state of at least one characteristic pertinent to interpersonal interactions possessed by the user prior to presentation of the at least one scenario,
   wherein the at least one scenario avatar has a human appearance and is programmed to exhibit emotional and cognitive behavior emulating a human in response to user input,
   wherein the user input comprises a plurality of emotional components and a plurality of cognitive components, and
   wherein the at least one scenario avatar's response to the user input comprises a plurality of emotional components and a plurality of cognitive components;
   a user input device in operative communication with the capture processor, wherein the user input device includes an audio input device to capture a voice input and an imaging input device to capture a body language input;

a capture processor configured to capture the user input; and an assessment processor configured to assess the at least one characteristic pertinent to interpersonal interactions possessed by the user using the captured user input.

27. The system according to claim 26, further comprising a goal processor in operative communication with the assessment processor and configured to generate at least one performance goal for the user, wherein the assessment processor assesses the at least one characteristic pertinent to interpersonal interactions possessed by the user relative to the at least one goal generated by the goal processor.

* * * * *